United States Patent
Sedgwick et al.

[15] 3,704,510
[45] Dec. 5, 1972

[54] MACHINE TOOL WITH TOOL CHANGER

[72] Inventors: Robert K. Sedgwick, Waukesha, Wis.; Werner K. Behrendt, Bielefeld, Germany; Hans J. Baechle, Rockford, Ill.

[73] Assignee: Kearney & Trecker Corporation, West Allis, Wis.

[22] Filed: March 13, 1962

[21] Appl. No.: 181,226

Related U.S. Application Data

[63] Continuation of Ser. No. 50,495, Aug. 18, 1960, abandoned.

[52] U.S. Cl. ................................29/568, 214/1 BD
[51] Int. Cl. .............................................B23q 3/157
[58] Field of Search..............................29/568, 26 A

[56] References Cited

UNITED STATES PATENTS

| 3,052,011 | 9/1962 | Brainard et al. | 29/568 |
| 2,901,927 | 9/1959 | Morgan | 29/568 X |

*Primary Examiner*—Andrew R. Juhasz
*Assistant Examiner*—Z. R. Bilinsky
*Attorney*—Cyril M. Hajewski and Donald E. Porter

EXEMPLARY CLAIM

4. In a machine tool having a tool change station;
   a tool change mechanism provided with extensible tool gripping means carried for bodily movement in the tool change station;
   a tool storage matrix adapted to carry a plurality of cutting tools;
   power operable means connected to move said storage matrix for moving a preselected tool into said tool change station;
   positive drive means affixed to the preselected tool stored in said change station;
   a power driven rotatable tool spindle provided with complementary positive driving means and being carried for bodily movement relative to the tool change station;
   power driven means connected to effect bodily movement of said tool spindle into proximity to the tool change station and into predetermined spaced relationship to the preselected tool;
   means for rotating said tool spindle to a predetermined angular position to facilitate insertion of a preselected tool carrying the positive driving means;
   a releasable clamp mechanism carried by the tool receiving end of said tool spindle;
   a control mechanism including power driving means connected to actuate said gripping means for extensible movement into clamping engagement with the preselected tool carried by said matrix, said control means being operative after the tool is clamped to effect bodily movement of said tool change mechanism for withdrawing the preselected tool carried thereby from said storage matrix to effect bodily movement of the preselected tool into a position of axial alignment with said tool spindle, and to effect bodily insertion of the preselected tool into the tool receiving end of said spindle, said control mechanism being then operative to release said gripping means to inactive position;
   and means for actuating said clamp mechanism for securing the preselected tool in said spindle in a manner that the positive driving means respectively carried by said tool and said spindle are in positive intermeshing engagement.

37 Claims, 26 Drawing Figures

INVENTORS
Robert K. Sedgwick
Werner K. Behrendt
Hans J. Baechle
BY
William C. Gleisner Jr.
Attorney

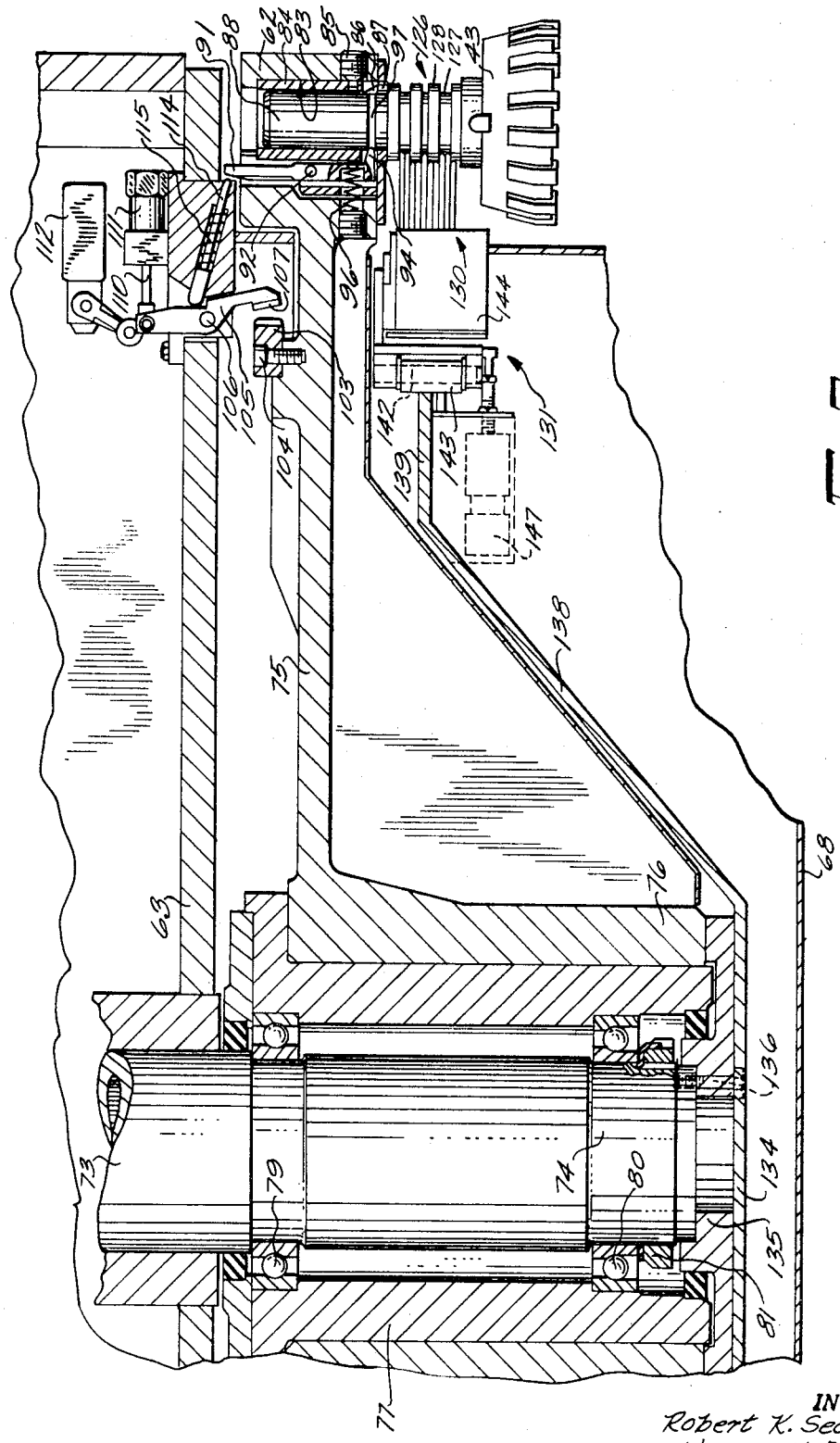

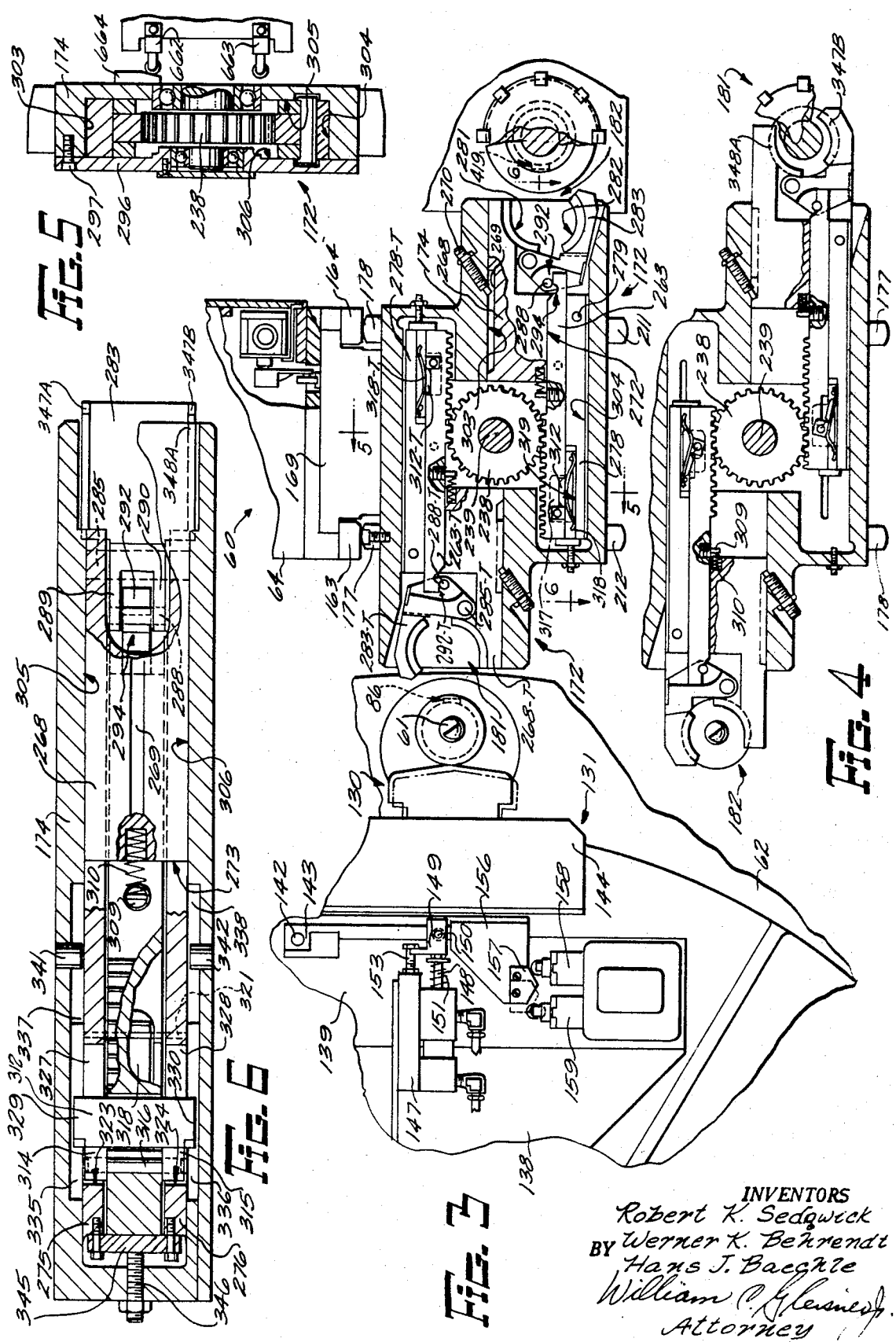

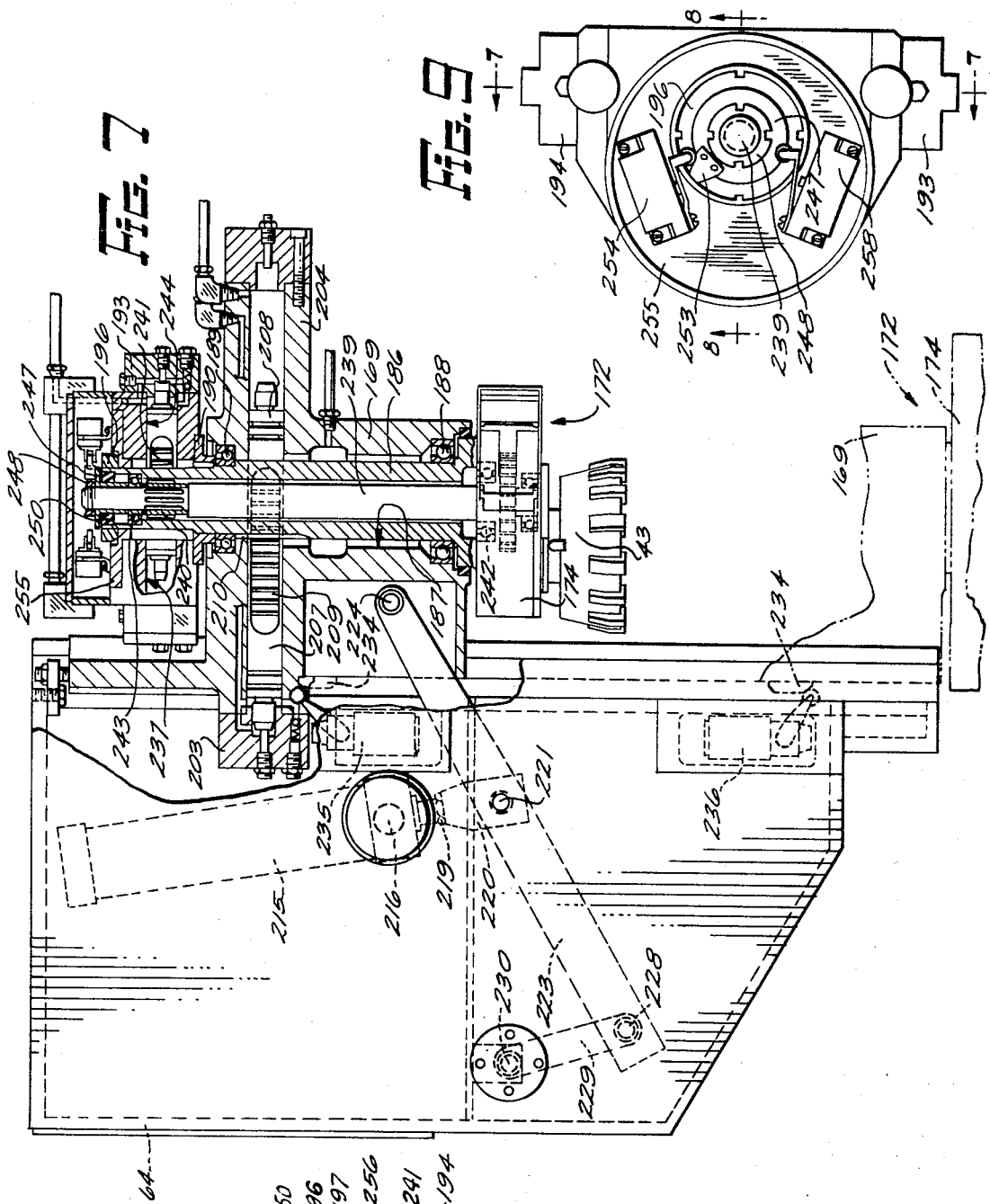
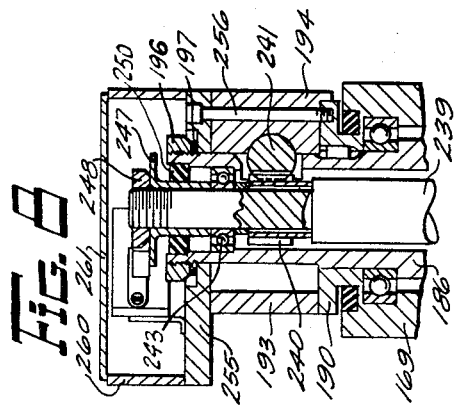

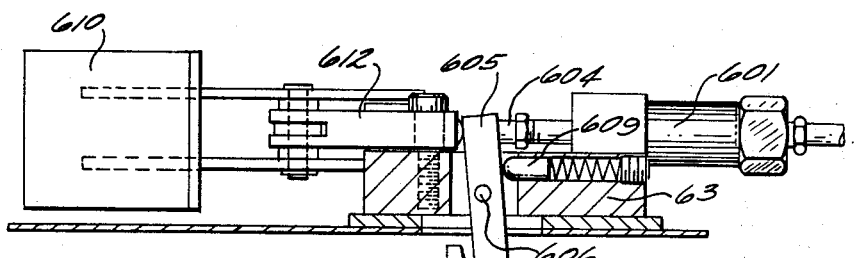
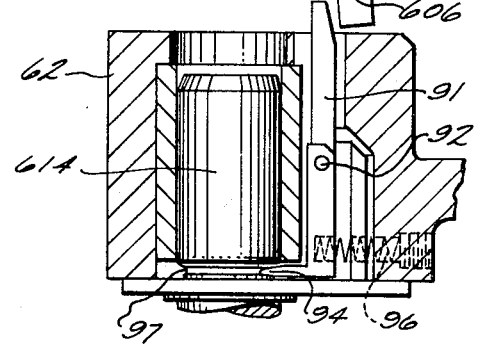
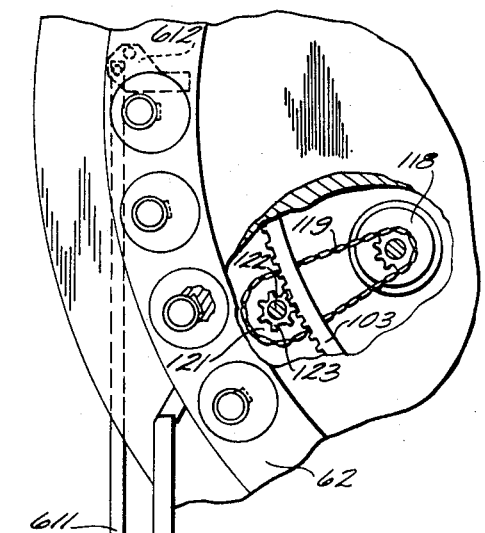
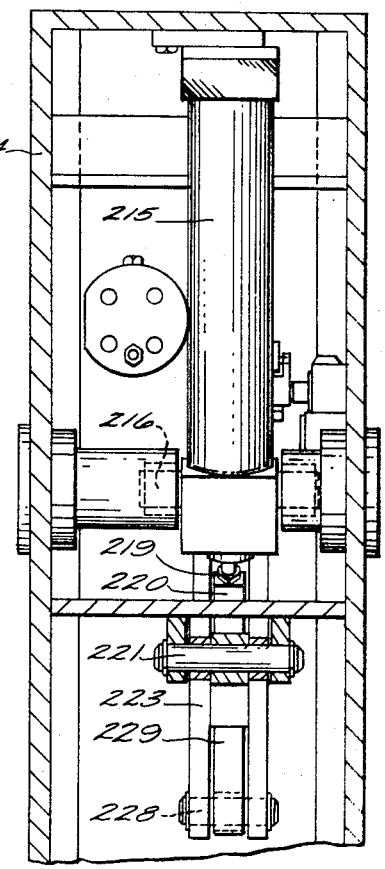
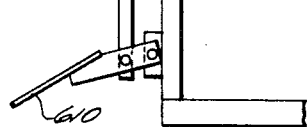

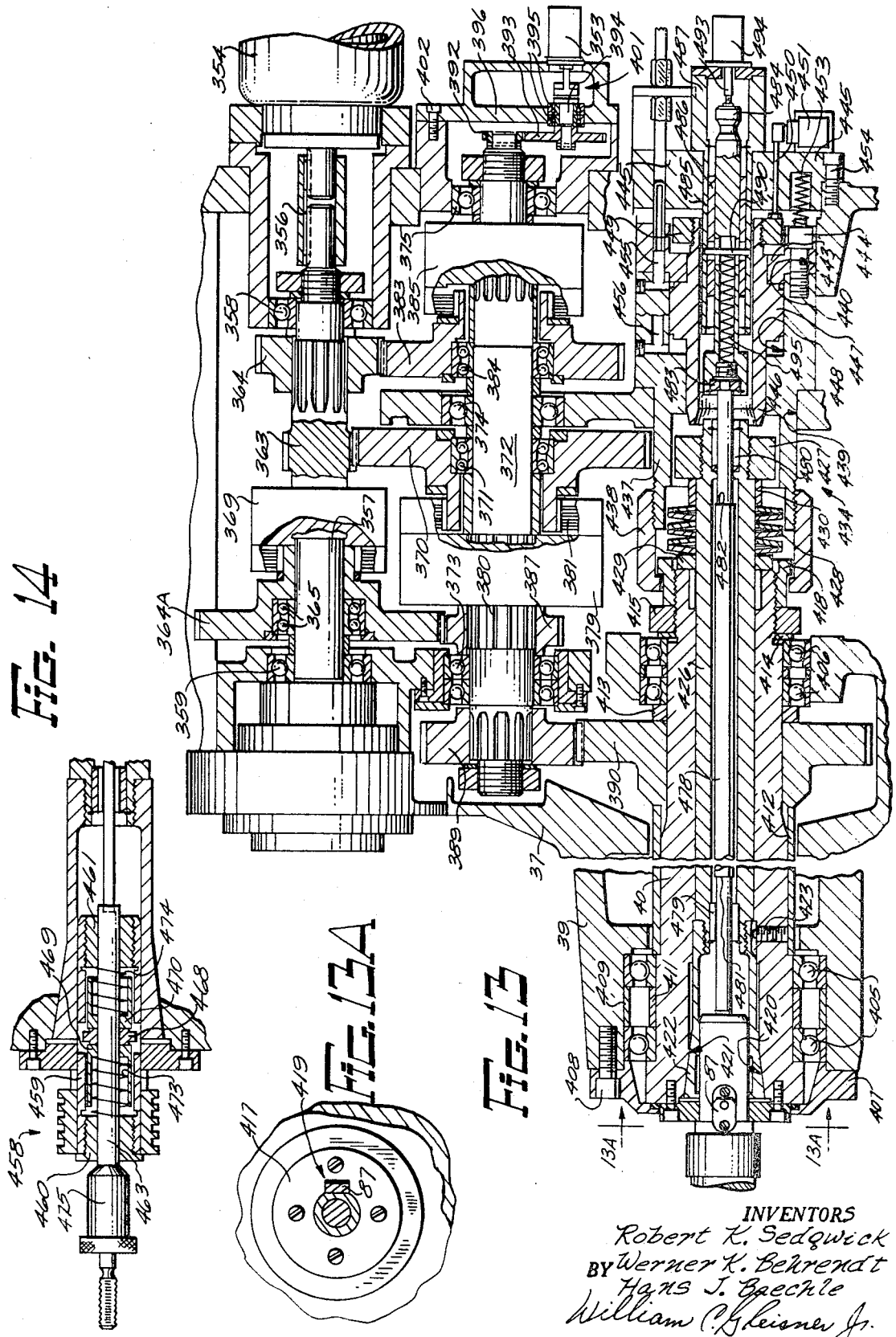

MACHINE TOOL WITH TOOL CHANGER

This is a continuation of our co-pending patent application, Ser. No. 50,495, filed Aug. 18, 1960, for a Machine Tool With Tool Changer, now abandoned.

This invention relates generally to machine tools, and, more particularly, to a machine tool incorporating an improved tool change mechanism.

The principal object of this invention is to provide an improved tool changing mechanism for a machine tool.

Another object of the invention is to provide a tool storage member particularly adapted to storing tools of relatively large diameter, and being adapted to selectively move a preselected tool into a tool change ready station with the tool being carried in predetermined angular relationship to the machine tool spindle.

Another object of the invention is to provide an improved tool change mechanism operative to interchange tools between a storage drum and a tool spindle in such a manner that positive intermeshing driving means are connected between the interchanged tool and the tool spindle.

Another object of the invention is to provide a selectively movable tool storage member provided with a plurality of tool storage sockets respectively having releasable tool securing means, and means for retaining the tools carried thereby in predetermined relative angular relationship.

Another object of the invention is to provide a simplified tool changing mechanism operative to bodily withdraw a tool from a tool receiving spindle, and insert a different preselected tool into the spindle for a subsequent machining operation.

Another object of the invention is to provide an improved mechanism for interchanging tools between a storage drum and a tool spindle, the tool being interchanged and the spindle socket being respectively provided with an interengaging key and keyway.

Another object of the invention is to provide an improved tool changing mechanism having various operatively interconnected parts carried for independent relative adjustment.

A further object of the invention is to provide an improved tool changing mechanism operative to interchange tools of relatively large diameter.

A further object of the invention is to provide an improved tool changing mechanism having tool grips that are selectively removable from a retracted position into extended clamped position with a pair of tools to be interchanged.

Another object of the invention is to provide an improved collet release mechanism for selectively actuating a releasable spring collet into clamped or unclamped engagement with a preselected tool.

A still further object of the invention is to provide a tool spindle having a releasable spring collet in operative proximity to positive drive means carried by the spindle in a manner that a tool is retained in operative driving engagement with the positive drive means by operation of the spring collet.

According to this invention, an improved machine tool is provided with a power driven rotatable tool spindle and a plurality of cutting tools stored in proximity thereto together with means for bodily interchanging a stored tool with a tool carried by the spindle. The stored tools are respectively provided with keys disposed to meshingly engage complementary keyways provided in storage sockets carried for positioning movement by a selectively indexable tool magazine or drum. For releasably securing a tool, the tool spindle is provided with a spring collet and a keyway adapted to be engaged by a key associated with the next selected tool. In order to effect a tool interchange between the storage drum and the tool spindle, the drum is indexed to advance a preselected tool to a tool change ready station. After this, the tool spindle is bodily moved to a spaced apart tool change station, and rotatably positioned to angularly align the keyway for receiving the tool. The tool change means is then actuated to effect extensible movement of a pair of tool grips into engagement with the tools respectively carried by the storage drum and the tool spindle; and, the tool change means are then actuated to bodily move the tools and reinsert the interchanged tools respectively in the storage drum and the tool spindle in a manner that the keys presented thereby are moved into meshing engagement with the complementary keyways. To effect the tool changing operation, coordinately operable release means are connected to actuate the spring collet in the spindle for releasing a tool carried thereby prior to the tool change, and reclamp the next selected tool after the tool changing operation has been completed. The complete sequence of machine movements necessary to effect a tool changing cycle is initiated in response to a manual or tape controlled signal with the necessary movements proceeding automatically in response thereto. Preferably, the entire machine tool including the tool selecting means and the tool changing operations are initiated by a predetermined program constituting a tape control system.

The foregoing and other objects of the invention which will become more fully apparent from the following description of the machine tool and tool change mechanism may be achieved by the embodiments described herein, as illustrated in the accompanying drawings, in which:

FIG. 2 is a fragmentary view in horizontal section of the tool storage magazine and one of the associated storage sockets;

FIG. 3 is an enlarged fragmentary view, partly in elevation and partly in vertical section, showing a portion of the tool change magazine, the tool change mechanism and the associated tool receiving spindle;

FIG. 4 is an enlarged fragmentary view in vertical section of the tool change mechanism showing a pair of tools in interchanged position;

FIG. 5 is a fragmentary view in vertical transverse section through a portion of the tool change mechanism;

FIG. 6 is an enlarged detailed view, partly in elevation and partly in horizontal section, and with certain parts broken away to show the details of the mechanism for actuating one of the tool securing grips;

FIG. 7 is a view in transverse vertical section through the tool change mechanism showing the power actuating means for effecting the sequencing movements utilized to effect a tool change operation;

FIG. 8 is a view in horizontal section, taken generally along the lines 8—8 in FIG. 9, through the rearward end of the tool change mechanism;

FIG. 9 is a view in rear elevation of the cam mechanism together with the cooperating limit switches for indicating whether the tool grips are in retracted or extended position;

FIG. 10 is a view partly in horizontal section and partly in plan through the support for the tool change mechanism;

FIG. 11 is an enlarged fragmentary view in elevation showing the manual means for releasing a tool clamp associated with one or another of the tool storage sockets;

FIG. 12 is an enlarged fragmentary view in horizontal section taken partly through a portion of the tool storage drum and through the support of the manual tool release mechanism;

FIG. 13 is a view in transverse vertical section through the spindle and showing the transmission and collet release mechanism;

FIG. 13A is an enlarged fragmentary view in front elevation of the tool spindle;

FIG. 14 is an enlarged fragmentary view in vertical section through the front end of a spindle in combination with a tap holder;

Figure 19:
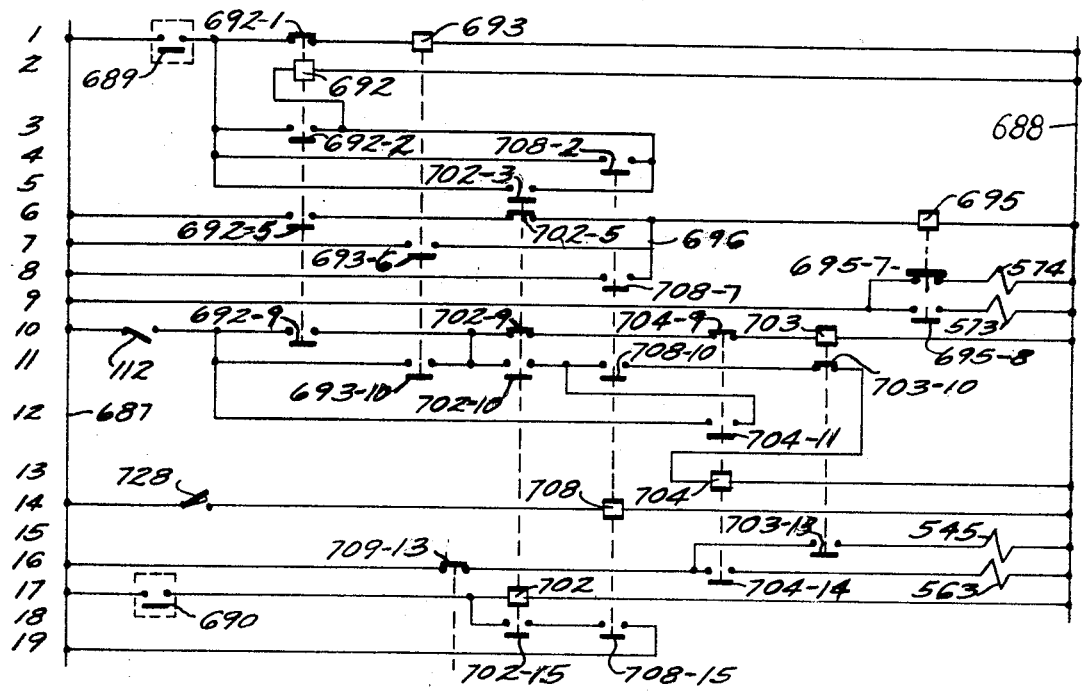
Figure 20:
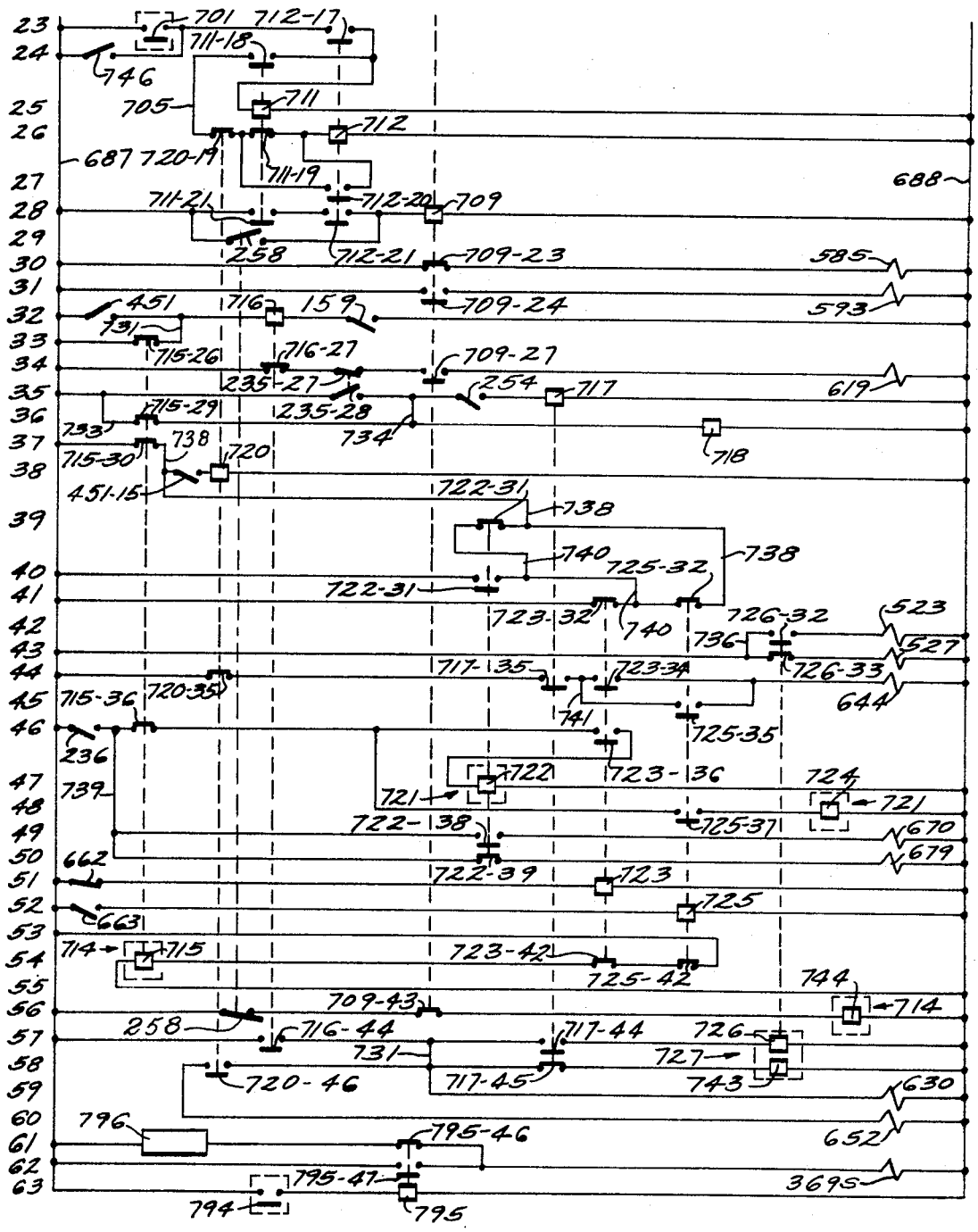
Figure 21:
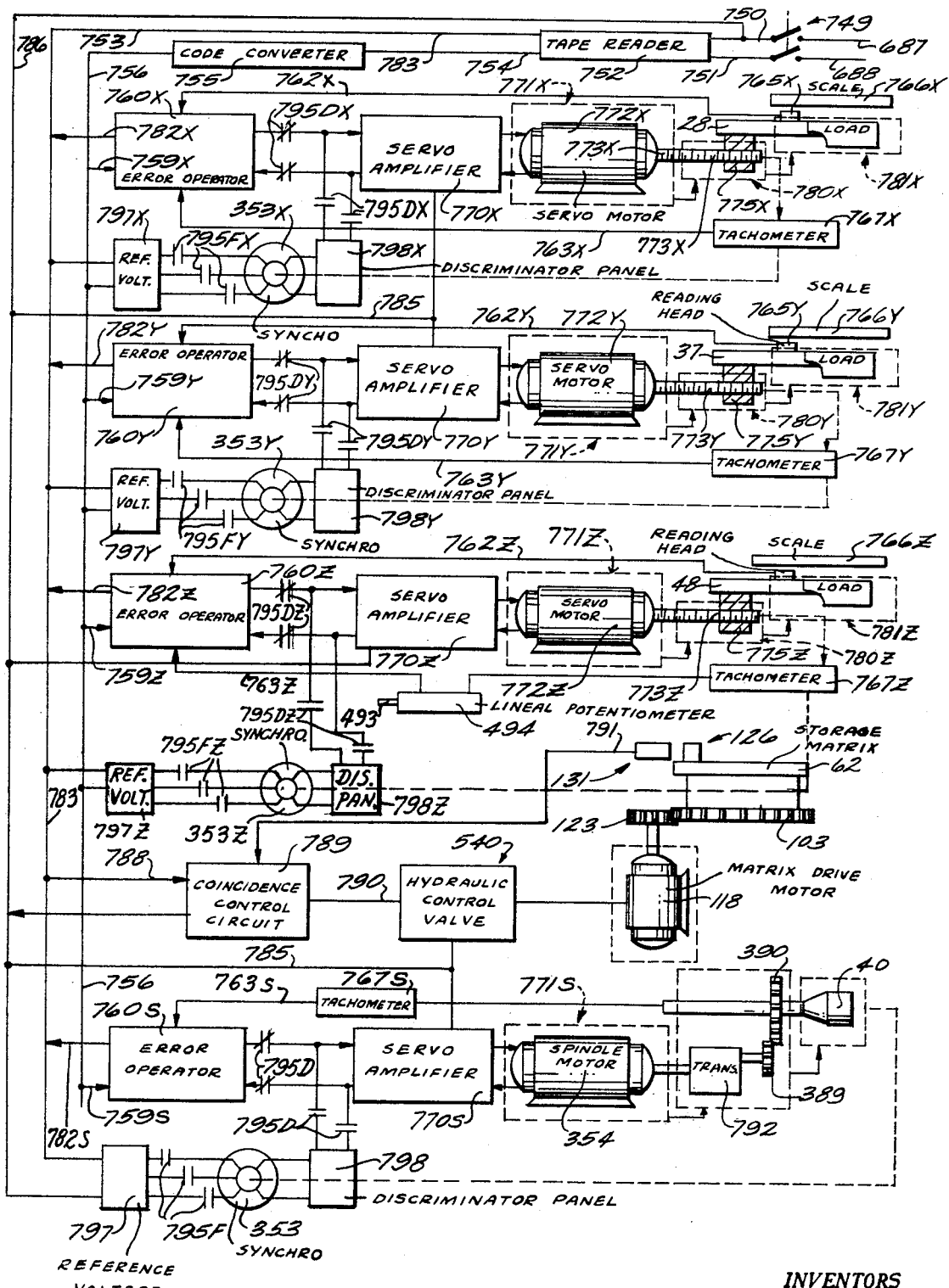

FIGS. 18A to 18E, inclusive, are representative of the sequence of movement required to interchange tools between the tool spindle and the tool storage magazine;

FIG. 19 is a schematic electrical circuit diagram showing a portion of the control circuit;

FIG. 20 is another schematic electrical circuit diagram showing a different portion of the control circuit for effecting a tool change; and, FIG. 21 is a schematic, block diagram illustrating the power control circuit for effecting selective movement of the various machine tool slides in response to the tape input.

Figure 1:
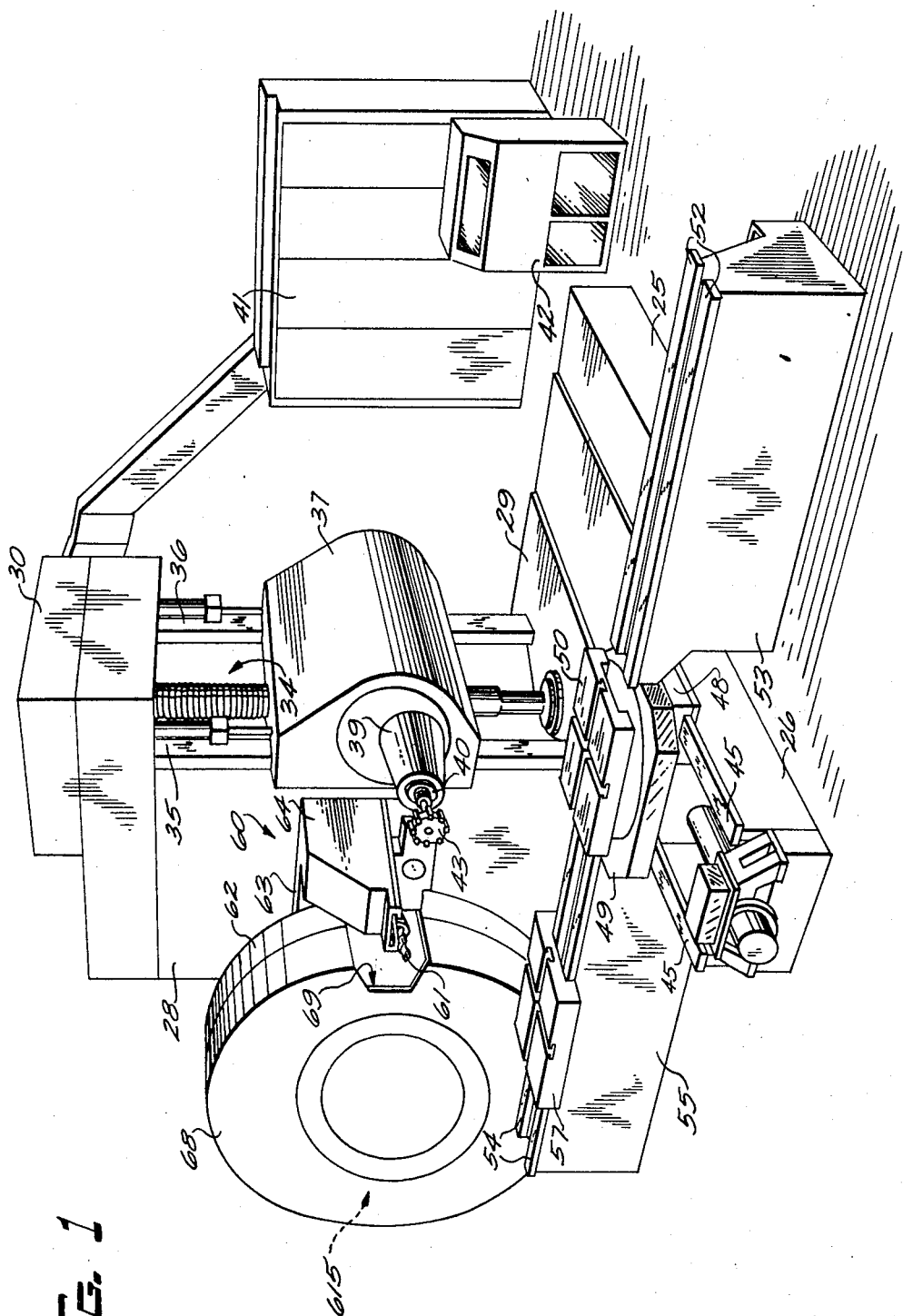
FIG. 1 is a view in perspective of a horizontal spindle machine tool, a tool storage magazine and a tool change mechanism and comprising a preferred embodiment of the invention.

Referring to the drawings, and particularly to FIG. 1 thereof, the invention is incorporated in a horizontal spindle type machine provided with a longitudinally extending base 25 and a forwardly extending base section 26. A vertically upstanding column 28 is slidably carried by the base 25 by means of cooperating ways [not shown] for selective longitudinal movement in either direction, along the X axis. The vertically upstanding column 28 is provided with lower and upper lateral extensions 29 and 30 that are respectively disposed to support the opposite ends of a rotatably journalled elevating screw 34. The column 28 is provided with vertically extending guideways 35 and 36, respectively disposed to slidably engage cooperating guideways [not shown] presented by the inner side face of a vertically movable spindle head 37. The usual elevating screw nut [not shown] is secured within the spindle head 37 in a manner to operatively engage the vertically journalled elevating screw 34. The spindle head together with a forwardly extending extension 39 secured thereto is disposed to rotatably support a tool spindle 40 extending rearwardly therethrough in a manner to be selectively driven by a transmission contained within the spindle head 37. As represented in FIG. 1, a milling cutter 43 is secured within the forward tool receiving end of the spindle 40.

The forwardly extending base extension 26 is provided with horizontally disposed, spaced apart way surfaces 45. The spaced apart way surfaces 45 in turn are disposed to slidably support a saddle 48 for selectively transverse movement relative to the frame 25, and the tool spindle 40.

It will be apparent that the tool spindle 40 is supported for vertical movement along a Y axis, and longitudinal movement along the X axis relative to the saddle 48 which is transversely movable along a Z axis. On its upper surface, the saddle 48 is disposed to rotatably support an index table 49, that in turn has releasably secured to its upper surface a work supporting pallet 50. The pallet 50 is releasably clamped to spaced apart ways [not shown] presented by the rotary table 49, and which are movable into alignment with longitudinally extending ways 52 presented by a right pallet support 53, and longitudinally extending ways 54 presented by a left pallet support 55. Another work supporting pallet 57 slidably carried upon the ways 54 is positioned in a loading station in preparation for subsequent movement along the ways into operative position upon the rotary table, as the pallet 50 is moved therefrom into an unloading station upon the ways 52. Inasmuch as the transfer mechanism for effecting selective movement of the pallet 50 into an unloading station is not a part of this invention, the operative structure and control arrangement is not disclosed herein. This mechanism is fully disclosed in a copending patent application to Brainard et al., entitled "Shuttle Pallet Transfer Device And Switching Control For Tape Readers," Ser. No. 777,122, which was filed Nov. 28, 1958.

During a machining operation, a pallet, such as the work supporting pallet 50, is fixedly clamped to the upper surface of the rotary table 49 for indexable movement therewith, and for selective transverse movement with the saddle 48 along the Z axis. The arrangement is such that, during a drilling operation for example, a metal cutting drill [not shown] secured within the tool spindle 40 is moved to a selected position along the X and Y axes, and the work saddle 48 is moved inwardly along the Z axis the required distance to perform the drilling operation, and then moved outwardly to permit repositioning of the tool spindle. Likewise, it will be apparent that other machining operations can be performed by effecting movement along any one axis.

One of the principal advantages of this invention is the fact that different tools, as required, may be automatically inserted into the tool receiving spindle 40 in a manner that a plurality of different machining operations may be performed with a minimum of time required for a tool changing function. This arrangement obviates the necessity for manually changing a tool since the tool presenting or tool change function as well as all other machine functions and movements are under the control of a tape carrying a coded program of machine functions to be performed.

As a prerequisite to effecting a tool changing operation, the saddle 48 is moved outwardly along the Z axis in a manner that a workpiece carried by the pallet 50 is moved outwardly a sufficient distance to prevent interfering with the movement of the tool spindle 40. After this, the tool spindle 40 is moved from any preceding operating position along the X and Y axes to a predetermined position adjacent the tool change mechanism 60, and relative to a preselected tool, such as the drill 61, carried by a movable tool storage magazine or matrix 62 at the opposite side of the tool change mechanism 60. Movement of the preselected tool into the tool change station adjacent the tool printing mechanism 60 is effected by the appropriate indexable movement of the storage drum 62 during the previous machining operation. Both the tool presenting or tool change mechanism 60 and the indexable storage magazine 62 are carried by a stationary support member 63, that is spaced apart from the longitudinally movable column 28. After a preselected tool, such as the drill 61, has been moved into the tool change station, the mechanism 60 is operative to effect an interchange between the milling cutter 43 and the drill 61 as will hereinafter be more fully explained. The tool storage magazine 62 is provided with a plurality of storage sockets adapted to carry a total of 30 different metal cutting tools, including drills, taps, boring bars and milling cutters. Thus, at the start of a tape controlled program of machining operations, there are a total of 31 tools available, including the tool already carried by the spindle 40 plus the 30 tools stored in the magazine. A hollow stationary, circular shield 68 having rearwardly extending flange sides is positioned to overlie the tools carried by the rotatable storage magazine 62. The stationary shield 68 is provided with a cut away portion 69 in a manner that one or another of the preselected tools may be advanced into the tool change ready station adjacent the tool change mechanism 60.

As hereinbefore explained, all machine movements and functions, including the tool change function, are controlled by an electronic control system 41 responsive to a tape reader contained within the cabinet 42.

As represented in FIG. 2, the tool storage magazine 62 is journalled to rotate about a stationary shaft 73 fixedly secured to the vertically upstanding stationary support member 63. The storage magazine 62 comprises an enlarged circular plate 75 integrally formed with a forwardly extending tubular portion 76, the latter, in turn, being fixedly secured to a rotatable hub 77. The hub 77 is provided with flanged ends engaging the outer races of bearings 79 and 80; the inner races of which are respectively retained in engagement with the stationary shaft 73 and a forward extension 74 of the shaft. The usual retaining nut 81 is threaded on the forward end of the shaft extension 74 to engage the inner race of the forward bearing 80, thereby retaining the hub 77 and the entire tool storage magazine 62 in rotatable engagement with the stationary shaft 73.

Toward its outer periphery, the circular plate 75 is provided with an enlarged rim having a plurality of peripherally spaced bored openings, such as the opening 83, disposed in parallelism with the axis of rotation of the storage magazine 62. Within each of the bored openings 83, there is provided a tool storage socket comprising a tubular sleeve 84 retained in position within the bored opening by means of a set screw 85. The sleeve 84 is provided with a keyway or notch 86 adapted to be engaged by a key 87 secured to a toolholder, such as the toolholder 88. It is noted that the keyway is always positioned in like angular relationship to the bored opening and in a plane extending radially from the axis of magazine rotation.

Inasmuch as the method of securing the milling cutter shank [not shown] within the toolholder 88 as well known in the art, it is deemed sufficient to state that each of the toolholders is adapted to be received within one or another of the storage sockets, as well as within the tool receiving end of the tool spindle 40, FIG. 1. During rotational indexing movement of the tool storage magazine 62, each of the toolholders 88 is forcibly clamped within the storage socket 84. To accomplish this, a clamp lever 91 is movably carried within an appropriate recess formed in the magazine adjacent the outer periphery of the tubular support sleeve 84, as shown in FIG. 2. The clamp lever 91 is journalled to pivot about a shaft 92, secured to the magazine, and is provided with an outwardly extending flanged end 94.

A spring 96 seated at one end against an adjusting screw within a circular recess formed in the rim of the storage magazine 62 is seated at its opposite end within a circular recess formed in the clamp lever 91 in a manner to urge a flanged lower end 94 thereof inwardly through a transverse slot formed in the tubular socket sleeve 84. Thus, the flanged lower end 94 of the clamp lever 91 is of arcuate shape normally disposed to engage an annular groove 97 formed toward one end of the toolholder 88. The spring 96 urges the lower end of the clamp lever 91 inwardly with sufficient force to prevent accidental outward displacement of the toolholder 88 from its storage socket during rotational movement of the storage matrix 62. Actually, the resiliently biased clamp lever 91 clamps the toolholder 88 within its socket with sufficient force to prevent either manual withdrawal of the tool 43 from the storage socket, or automatic retraction of the tool 43 from the storage socket during a tool changing function. To permit retraction of the tool 43 from the storage socket during an automatic tool changing function at the tool change station, therefore, it is necessary to completely disengage the clamp lever 91 from engagement with the annular toolholder groove 97. Each of the 29 other storage sockets in the magazine 62 is provided with resiliently biased latching mechanisms identical to that shown and described in FIG. 2.

The mechanism for releasing the clamp lever 91 is coordinately operative with a latching device disposed to effect final positioning movement of the tool storage magazine to a latched position for retaining a preselected tool in the tool change ready station. Likewise, as will hereinafter be more fully explained, a manually operative tool clamp release is provided at a spaced apart position from a tool change station to permit manual withdrawal of one tool and insertion of a different tool, for initially loading the tool storage matrix for effecting the necessary insertion or change of tools carried thereby.

Power for driving the storage magazine 62 for effecting selective indexable movement thereof is transmitted to a ring gear 103 secured to a rearwardly formed flanged shoulder formed on the circular magazine plate 75 by means of cap screws 104.

After the storage matrix 62 has been moved for advancing a preselected tool into the tool change ready station, a pivotal latching member 105 carried by the supporting frame 63 is actuated to latch the magazine in selected position. The latching lever 105 is journalled to pivot about a support shaft 106, and is provided at its one end with a gear segment 107 disposed to meshingly engage the gear teeth presented by the ring gear 103. At its opposite end, the latching lever 105 is pivotally secured to a piston rod 110 associated with an actuating cylinder 111. Upon arrival of the magazine 62 at its approximate final preselected position, the cylinder mechanism 111 is activated to urge piston rod 110 rightwardly, thereby effecting pivotal movement of the lever 105 for urging the gear segment 107 into meshing engagement with the ring gear 103 for fixedly retaining a preselected tool in the exact required position. As this occurs, the particular tool clamp mechanism associated with the preselected tool is actuated to disengaged position, in a manner that the tool itself may be automatically retracted from its associated storage socket 84 during a subsequent tool changing function. To accomplish this, an actuating rod 114 is slidably carried within an angularly formed bored opening toward the edge of the stationary magazine support 63, in a manner that one end thereof is retained in operating position adjacent the upper end of the pivotal clamp lever 91. A spring 115 carried within an enlarged portion of the circular bored opening in the support 63 is connected to normally urge the actuating rod 114 to leftward disengaged position. During rightward movement of the piston rod 110 to effect latching engagement of the gear segment 107, a cam surface presented by the inner face of latching lever 105 is moved to effect rightward axial movement of the actuating rod 114 in opposition to the spring 115. As this occurs, the actuating rod 114 engages the upper end of the pivotal clamp lever 91, thus moving the flanged lower end of the clamp lever in a clockwise direction to disengage it from the annular groove 97 presented by the toolholder 88.

Prior to actuation of the cylinder mechanism 111 to latch the storage matrix 62 in selected position and release the tool clamp 91, it is necessary to indexably move the storage magazine 62 the required amount for positioning a particular preselected tool at the tool storage station. To accomplish this, as shown in FIG. 11, a motor 118 is selectively activated to effect rotational movement of the tool storage magazine. The shaft of the motor 118 is provided with a sprocket engaging a chain 119 that engages another sprocket 121 secured to one end of a stub shaft 122 rotatably journalled in the support frame 63. The inner end of the stub shaft 122 is provided with a pinion 123 that engages the ring gear 103 fixedly secured to the circular plate 75 of the storage matrix 62.

For stopping rotational movement of the storage matrix 62 to position a preselected tool in the tool change ready station, each of the toolholders, such as the toolholder 88 in FIG. 2, is provided with a coded collar 126. As will hereinafter be more fully explained, the collar 126 is provided with axially spaced annular grooves 127 and annular rings 128, the number of grooves and rings as well as their respective axial positions being different on each of the toolholders to provide a different binary code signal for each of the toolholders. Thus, the grooves 127 and rings 128 carried by the collar 126 provide a binary code signal to actuate radially movable switch actuating leaves 130 carried by a retractable switch mechanism 131.

In the event the numerical control system provides an input signal calling for the milling cutter 43, FIG. 2, subsequent rotational movement of the storage matrix 62 for positioning this tool in a ready station would be stopped upon engagement of the coded rings presented by the collar 126 with the switch actuating leaves 130. After this, the switch mechanism 131 is caused to be moved in a leftward, or clockwise direction, as viewed in FIG. 3, to retract the radially movable switch leaves 130 from engagement with the grooves on the coded collar 126. With the switch mechanism 131 moved in clockwise direction, the milling cutter 43 and associated toolholder 88 is then conditioned for automatic retraction from the storage socket 84 during a subsequent tool changing operation. Irrespective of the location of the milling cutter 43 in the magazine, indexable movement thereof is stopped upon arrival of this particular tool at the ready station in the event the input signal called for this tool. The method and structure utilized to effect indexable advancement of the magazine for advancing a code identified tool in a tool change ready station is fully disclosed and described in U.S. Pat. No. 3,052,011.

Figure 18A:
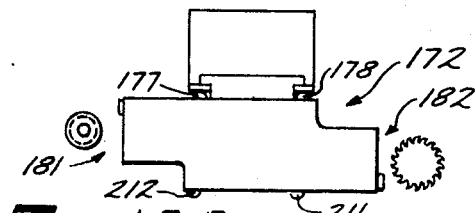
Figure 18B:
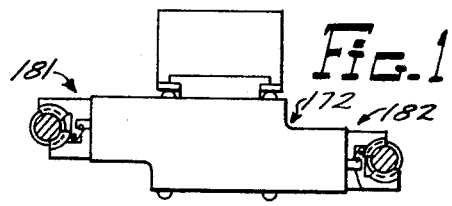
Figures 18C, 18D, 18E:
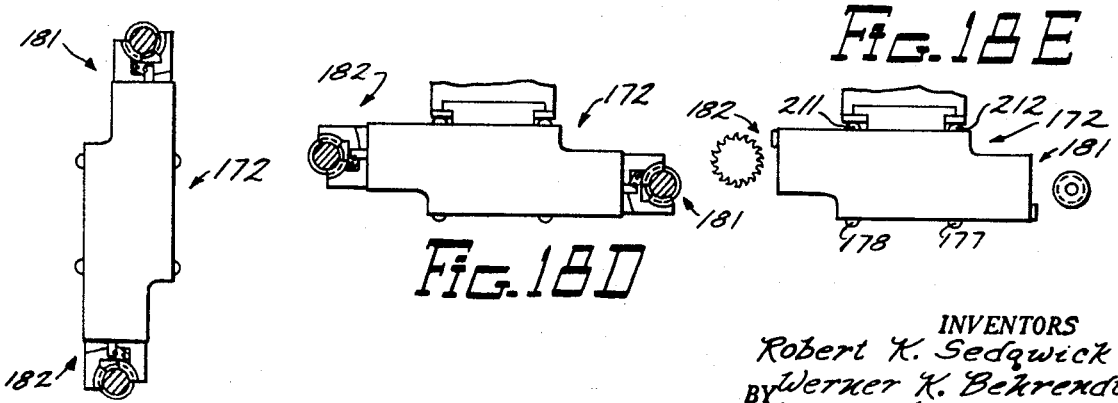

As shown in FIG. 2, the milling cutter 43 is carried by the socket 84 at the completion of a tool change operation, i.e., after the tools 61 and 43 have been interchanged to the positions shown in FIG. 18E.

To support the code actuated switching mechanism 131 relative to the rotating tools carried by the rotatable tool storage magazine 62, a stationary arm 134 is secured to the forwardly extending end 74 of the stationary shaft 73. The support arm 134 is spaced outwardly from the front end of the shaft extension 74 by means of a circular flanged extension 135, and secured thereto by means of cap screws 136. The support arm 134 is integrally formed with an inwardly extending portion 138 to support the retractable switch mechanism 131. As shown in FIGS. 2 and 3, the arm 138 has secured to its outer end a support plate 139 disposed in parallelism with the plane of rotation of the storage magazine 62. The support plate 139 is provided with an enlarged lug having a threaded opening engaged by an outwardly extending cap screw 142 constituting a pivot shaft. A laterally extending arm 143 secured to the housing 144 of the switch mechanism 131 is provided with a bored opening that is rotatably engaged by the cap screw 142 for pivotable movement.

A switch retracting cylinder 147 is provided with a piston rod 148, adjustably secured at its outer end to a rectangular connector 149, the latter being provided with a bored opening engaging a pivot shaft 150 fixedly secured to the housing 144. As shown in FIG. 3, the piston rod is normally biased to its extreme rightward limit of movement by means of a spring 151 for maintaining the switch leaves 130 in a position to be successively engaged by the coded collars respectively presented by the various toolholders as they travel in a circular path relative to the switch mechanism. Upon arrival of a preselected tool at the tool change ready station, the cylinder mechanism 147 is activated to effect a clockwise pivotal movement of the housing 144 to the dotted line position indicated in FIG. 3, thereby moving the switch leaves 130 to a retracted position relative to the coded collar presented by the preselected tool.

To adjust the allowable pivotable range of movement of the switch mechanism 131, the rectangular connector 149 is integrally formed with an upwardly extending arm engaged by an adjusting screw 153 threaded in a spacer block integrally formed with the support member 139. Actually, pivotable switch movement is limited by the head of the adjusting cap screw 153 in one direction, and in the other direction by a jam nut operative to retain the screw in adjusted position. The housing 144 is provided with another laterally extending arm 156 that carries an actuating cam 157 disposed to engage a limit switch 158 or a limit switch 159, depending upon the pivotably adjusted position of the switch mechanism 131. It will be apparent that whenever the housing 144 is biased outwardly in a manner that the switch actuating leaves 130 intercept the circular path of travel of the coded collars, the cam 157 will actuate limit switch 158. Conversely, whenever the cylinder 147 is activated to pivot the switch mechanism 131 to its inward retracted position, the cam 157 is moved to actuate the limit switch 159. As will hereinafter be more fully explained, the switches 158 and 159 are interconnected in the control circuit and constitute a portion of the control for effecting a selective tool change.

As hereinbefore explained, the process of preselecting a tool in response to coded tape input information is effected during the performance of a different preceding machine function, usually a machining operation. Thus, when that particular machining operation is complete, a preselected tool has already been moved into the tool change ready station adjacent the tool change mechanism 60. At that moment, in the event a tool change function is called for by the control tape, the spindle head 37 is bodily moved along the X and Y axes to a ready station on the opposite side of the tool change mechanism 60, as shown in FIG. 1. At the same time, the tool spindle 40 is moved to an angular position for aligning the key 87 presented thereby in proper relationship to the keyway presented by the storage socket. After this has been accomplished, as shown in FIG. 3, the tool spindle 40 is positioned in the tool change ready station rightwardly of the tool change mechanism, and in a plane slightly lower than the preselected tool carried by the storage magazine 62. Irrespective of the location of the tool spindle 40 during the previous machining operation, it is returned to the predetermined tool change ready station indicated in FIG. 3.

The tool change mechanism 60 comprises essentially a forwardly extending support member 64 having secured to its under side a pair of inwardly projecting guideways 163 and 164, cooperating therewith to provide a flanged support for receiving the flanged upper portion of a carriage 169. The carriage 169, as shown in FIG. 3, is provided with a flanged upper portion disposed to be guidably constrained to the under side of the support member 64 by guideways 163 and 164 for selective reciprocable movement along an axis parallel to the axis of rotation of the tool spindle 40. As shown in FIGS. 3 and 7, a tool change member or tool changer 172 is pivotably secured to the guiding carriage 169 for selective axial movement therewith along the guideways 163 and 164. The tool changer 172 comprises a hollow housing structure 174 having secured to its upper face a pair of spaced apart upwardly projecting guiding abutments 177 and 178. At the start of a tool change cycle the guiding abutments 177 and 178 are normally retained in guiding engagement with the under side of guideways 163 and 164 in a manner to retain the housing 174 in predetermined angular relationship to the carriage 169. Further, at the start of a tool change cycle, the carriage 169 and pivotally mounted tool changer 172 are maintained at their extreme rearward position relative to guideways 163 and 164 and the support member 64, as shown in FIGS. 3 and 7.

The tool changer 172 is provided with a pair of oppositely extensible tool grips 181 and 182. The tool changer 172 including the extensible tool grips 181 and 182 constitute a tool presenting means whereby a selected tool is presented for relative movement into operative positive driving engagement with the spindle 40. The tool grips 181 and 182 are selectively movable from a retracted position within the tool changer housing 174, FIG. 3, into fully extended clamped engagement with toolholders respectively carried by the storage magazine 62 and the tool spindle 40, as represented in FIG. 4.

In order that the tool changer 172 may be bodily rotated to effect an interchange of tools, the hollow housing 174 associated therewith is integrally formed with a rearwardly extending hollow tubular shaft 186 extending through a circular opening 187 formed within the rectilinearly movable carriage 169 as shown in FIG. 7. Concentrically formed with the circular carriage opening 187, are a pair of enlarged recesses disposed to receive the outer races of antifriction bearings 188 and 189, the inner races of which support the tubular shaft 186. Rearwardly of the bearing 189, a flanged spacing collar 190 keyed to the periphery of the tubular shaft 186 is provided with a tubular extension abutting the inner race of bearing 189. As shown in FIGS. 7 and 8, a cylinder 193 is secured between the flanged spacer 190 and a rearwardly spaced switch support plate 255 by means of peripherally spaced cap screws 256. Thus, the cylinder 193 and switch support plate are pivotably movable upon corresponding rotation of the tubular shaft 186. The tubular shaft 186 extends through the cylinder 193 and is provided with a threaded rearward end disposed to be engaged by a complementary threaded lock nut 196 engaging a lock washer 197 abutting the support plate which abuts a rearward edge of the cylinder to retain the hollow housing 174 and associated intermediate parts in proper operating relationship as hereinbefore described.

For effecting automatic pivotable movement of the housing 174 at the proper time during a tool change, the central rearward portion of the carriage 169 is integrally formed with a pair of axially aligned cylinders 203 and 204. The cylinders 203 and 204 are provided with axially aligned bored openings disposed to receive pistons 207 and 208 secured to the opposite ends of a rack 209. The rack 209 is disposed to operatively engage complementary gear teeth 210 formed toward the central rearward periphery of the tubular shaft 186. The opposed cylinders 203 and 204 are integrally formed with the carriage 169 and are rectilinearly movable therewith during a tool change function, the cylinder 203 being disposed to extend upwardly between the guideways 163 and 164 into a hollow central portion of the support member 64. Whenever the rack 209 is in its upward position relative to the support member 64, as shown in FIG. 7, guiding abutments 177 and 178 secured to the upper surface of the housing 174, FIG. 3, are aligned to engage the under side of spaced apart guideways 163 and 164. Conversely, whenever the piston 207 is actuated to urge the rack 209 to its downward position, the entire housing 174 is pivoted 180° in a counterclockwise direction in a manner that guiding abutments 211 and 212 secured to the lower face of the housing 174, as shown in FIG. 3, are positioned to be aligned with guideways 163 and 164.

It will be apparent that pivotal movement of the housing 174 in response to selective actuation of the rack 209, FIG. 7, does not occur until the carriage 169 is moved to its extreme outermost position along the supporting guideways 163 and 164. Whenever the carriage 169 is advanced from the position shown by the solid lines in FIG. 7 to its extreme outermost position, the housing 174 may be selectively pivoted in either a clockwise or counterclockwise direction, as required, to effect an interchange in the position of tools respectively carried by tool grips 181 and 182, FIG. 3. As represented by the phantom lines in FIG. 7, the tool changer housing 174 is shown in an intermediate 90° position relative to the supporting carriage 169 and the outer ends of the guideways 163 and 164 carried by the support 64. It will be readily apparent that the housing 174 together with the tools secured thereto will clear the ends of the guideways only when the carriage 169 is in its extreme forward position.

For retaining the carriage 169 and housing 174 in rearward position adjacent the tool change ready station, there is provided a power actuated hydraulic driving mechanism as shown in FIGS. 7 and 10. As there shown, a hydraulic cylinder 215 is secured at its forward end to a transverse shaft 216 journalled for pivoting movement within a pair of circular bearing recesses presented by inwardly extending shoulders integrally formed with the support 64. An axially movable piston rod 219 associated with the cylinder 215 is provided with a squared end 220 that is pivotably secured by means of a shaft 221 to the central portion of an actuating arm 223. The low end of the actuating arm 223 is provided with a transversely formed bored opening journalled to rotate about a shaft 224 secured at its opposite ends within the carriage structure 169. At its upper end the actuating arm 223 is pivotally secured by means of a shaft 228 to a pivot link 229 supported for pivotal movement by a shaft 230 secured within the forward upper portion of the hollow support member 64. With the cylinder 215 actuated to retain the piston rod 219 in the position represented in FIG. 7, the associated linkage, including the pivotally interconnected link 229 and arm 223, are urged in a direction to retain the carriage 169 and tool changer 172 in their extreme rearward positions to position the tool grips 181 and 182, FIG. 3, in operating positions adjacent the tool change ready stations. In rearward position, a dog 234 secured to the carriage is positioned to actuate a limit switch 235 secured to an inner side wall of the support member 64.

After the tool grips 181 and 182, FIG. 3, are moved laterally into extended clamping engagement with the associated tools during a tool change function, the cylinder 215, FIG. 7, is activated to effect axial movement of the piston rod 219 for urging the carriage 169 and housing 174 to extreme outward position, thus effecting axial retracting movement of the tools from the associated sockets. With the cylinder 215 activated to urge the piston rod 219 axially outward for moving the carriage 169 and tool changer 172 outwardly, the dog 234 actuates a switch 236. As soon as this occurs, the housing 174 is caused to pivot 180° from the position it occupies as depicted in FIG. 18B to the position it occupies as shown in FIG. 18D for interchanging the position of the tools. The cylinder 215 is again activated to urge the piston rod 219 in the reverse direction for returning the carriage and housing 174 to their innermost position, during which the interchanged tools are simultaneously inserted into the sockets respectively provided in the storage magazine and tool spindle.

For actuating the tool grips 181 and 182 from the retracted position shown in FIG. 3 to an extended clamped position, FIG. 4, a drive pinion 238 is disposed to be rotated in a counterclockwise direction. The drive pinion 238 is secured to the outer end of a shaft 239 extending rearwardly through a bored opening in the tubular sleeve 186, and having secured to its rearward end a gear 240. The shaft 239 and gear 240 are driven by an actuating rack 241. At its forward end, the shaft is rotatably supported by a bearing 242 having its outer race supported within a circular recess formed within the housing 174; and, at its rearward end by a bearing 243 having its outer race carried within an enlarged circular recess formed in the rearward end of the tubular shaft 186. As shown in FIGS. 7 and 8, an elongated tubular end of a spacing washer 247 is retained in abutting engagement with the inner race of bearing 243 by means of the usual lock nut 248 threaded on the extreme rearward end of shaft 239, a seal 250 being carried forwardly of the flanged end of the spacing washer.

As shown in FIGS. 7, 8 and 9, the tubular spacing washer is secured for rotation with the shaft 239, and has fixed to its flanged edge a cam plate 253. With the tool grips 181 and 182 in retracted position, the shaft 239 is so positioned that the cam plate 253 secured thereto engages a limit switch 254 that is fixedly secured to the switch support plate 255. The circular support plate 255 constitutes a carrier for the switch 254, as well as for a limit switch 258 secured thereto in angularly spaced relationship. The support plate 255 is disposed to cooperate with a tubular shield 260 and rear cover plate 261 to constitute an enclosure for the switch mechanism, including limit switches 254 and 258, constituting a portion of the sequence control device for effecting a tool change function. As shown in FIG. 8, the switch support plate 255, cylinder 193, and flanged collar 190 are carried for bodily pivotable movement along with the tubular tool change shaft 186.

Inasmuch as the cylinder 193 is carried for bodily pivotable movement along with the tubular shaft 186, it functions to retain the tool grip control shaft 239 in preselected angular position. For effecting rotary movement of the shaft 239, the gear 240 secured thereto is engaged by rack 241 secured at its opposite ends to pistons respectively carried for slidable movement in axially aligned bored openings 237 and 244 formed in the opposite ends of cylinder 193. Whenever the rack 241 is retained in leftward position, the cam plate 253 is retained in actuating engagement with limit switch 254, indicating that the respective tool grips 181 and 182 are in the retracted positions shown in FIG. 3. Whenever the tool grips 181 and 182 are urged into outwardly tool gripping engagement, as shown in FIG. 4, the rack 241 is retained in its extreme rightward position, as viewed in FIG. 7, with the cam plate 253 being retained in actuating engagement with limit switch 258, FIG. 9. With the tool grips 181 and 182 extended into clamped engagement with the toolholders, as shown in FIG. 4, hydraulic fluid under pressure is continuously supplied within the cylinder 193, FIG. 7, to retain the rack in a rightward direction. Thus, continuous clamping pressure is applied to the tool grips 181 and 182 during a tool changing movement.

It will now be assumed that the tool storage magazine and spindle head 37 have been positioned as shown in FIGS. 1 and 3 in preparation for a tool change. It will be further assumed that the tool clamps respectively associated with each of the storage sockets, in the matrix 62 and the tool spindle 40 have been released; and, the tool spindle 40 angularly adjusted to position the keyway provided therein in proper relationship to the keyway carried by the storage socket 84. With these conditions existing, the rack 241 is in leftward position and the tool grips 181 and 182 are in retracted position, with the cam 253 engaging limit switch 254. At this moment, a tool changing cycle is initiated by a signal from the numerical control system. Thereupon, the rack 241, FIG. 7, is urged rightwardly to effect extensible movement of the tool grips 181 and 182 from retracted position, FIG. 3, into engagement with the tools respectively carried by the matrix 62 and tool spindle 40, FIG. 4. As soon as this occurs, the hydraulic cylinder 215, FIG. 7, is activated to effect rectilinear forward movement of the carriage 169 and tool change member 172 forwardly to the limit of movement as indicated by the phantom line position in FIG. 7. Next, the rack 209 is urged rightwardly to effect pivotal movement of the entire tool change member, together with the tools secured thereto, 180° in a counterclockwise direction to bring the guiding abutments 211 and 212 into approximate horizontal alignment with the under side of the guideways 163 and 164. The cylinder mechanism 215, FIG. 7, is then again activated to return the carriage 169 and tool change member 172 to the limit of movement in a rearward direction. During this rearward movement, guide abutments 211 and 212 are moved into guiding engagement with the under sides of guideways 163 and 164 for properly realigning the interchanged tools with the respective storage sockets presented by the magazine 62 and tool spindle 40. The interchanged tools are inserted into the storage sockets, tool 61 being inserted into the tool spindle 40 and tool 43 inserted into the empty storage socket in the tool magazine 62. The tools are then reclamped in interchanged positions, and the rack 241, FIG. 7, again urged to its leftward position for returning tool grips 181 and 182 to retracted position in readiness for the next tool changing cycle. The general sequence of events accompanying a tool change cycle is schematically represented in FIGS. 18A to 18E inclusive. The bodily rectilinear movement of the supporting carriage and tool change member 172 from rearward to outward positions is indicated by the solid and phantom lines in FIG. 7, as hereinbefore explained. It will be apparent that the tool change member 172 is rotated in a counterclockwise direction to effect an interchange during this particular tool changing cycle, as shown in FIG. 18C. After the tool change member has functioned to place the interchanged tools in their respective desired positions and the tool grips 181 and 182 returned to their retracted positions, as shown in FIG. 18E, it will be apparent that the tool change member 172 is so positioned that the guide abutments 211 and 212 are retained in guiding engagement with the under side of the guideways. During the next subsequent tool changing cycle, therefore, the general sequence of events will be identical to that hereinbefore described with the exception that the tool change member 172 will be rotated 180° in a clockwise direction to return the guiding abutments 177 and 178 into alignment with the guideways. Thus, the direction of pivotable movement of the tool change member 172 depends on its position at the moment the tool changing cycle is initiated. Each succeeding cycle for effecting a tool change effects 180° rotation of the tool change member 172 in an opposite direction.

One of the principal advantages of this invention is the fact that cutters of a relatively large diameter may be successively interchanged between a tool storage magazine and the tool spindle. This is accomplished, in part, by the novel arrangement of extending the tool grips from a retracted position into extended clamping engagement with the tools. Likewise, the tool change member 172 is so arranged as not to interfere in any manner with the tool that is to be interchanged. The tool grips 181 and 182 are disposed to engage the coded collars utilized for tool identification. Likewise, the tool grips are retracted within a housing 174 of minimum width in a manner that the entire housing is positionable between the front face of the tool spindle extension 39 and the rearward face of a tool to be changed, such as the milling cutter 43 in FIG. 1.

During a tool changing cycle, as the entire tool change member 172 is being pivoted 180°, the tool grips 181 and 182 are disposed to grip the tools with sufficient force to preclude angular displacement of the tools. Thus, the keys carried by the toolholders are engageable with the complementary keyways provided in the tool sockets. Likewise, with the tool spindle positioned in the proper angular position prior to initiating a tool change cycle, the keyway presented thereby is positioned to receive the cooperating key fixed to the toolholder of the tool about to be inserted therein. During the tool changing cycle, the control system for effecting angular positioning of the tool spindle is disposed to positively retain the spindle in predetermined angular position. As the selected tool is inserted therein, the beveled faces of the key secured to the corresponding toolholder are moved into engagement with the keyway in the spindle effecting a slight angular movement of the toolholder within the tool grip. Thus, after the spindle clamp is operated to clamp the selected new tool in the spindle, the cooperating key and keyway provide a positive driving connection between the tool spindle 40 and the selected milling cutter. Although the positive drive between the tool spindle and cutter is advantageous for all types of cutting tools, it is especially advantageous for cutters of larger diameter, such as the milling cutter 43 in FIG. 1. It is to be especially noted that the complete tool changing cycle is automatic, with no manual adjustment or selection being required. Thus, after the selected tool is clamped to the tool spindle with the driving key engaging the spindle keyway, the entire spindle head 37 may be bodily moved to effect the next required machining operation. During such an operation, as hereinbefore explained, the tool storage magazine 62 is indexably moved in response to the numerical control system for positioning the next selected tool in operative proximity to the tool change mechanism.

The novel tool grips 181 and 182 are operated simultaneously into extensible clamped position upon counterclockwise rotation of the gear 238 as shown in FIGS. 4 to 6, inclusive. To facilitate the description, only the operation of the tool grip 182 will be described in detail since it will be apparent that tool grip 181 is operated in identical fashion to tool grip 182. Where deemed advantageous, appropriate corresponding parts associated with the tool grip 181 are identified by the same reference numeral as that applied to the parts in tool grip 182, with the exception that those parts associated with grip 181 are identified by the suffix T.

The gear 238 is disposed to meshingly engage rack 263 slidably constrained for rectilinear movement by the bifurcated lower portion of a tool change arm 268. As shown in FIGS. 3 and 6, the forward upper portion of the tool change arm 268 is provided with a longitudinally extending groove 269, coacting with an adjustable limit screw 270 threaded in the housing 174 to limit the outward extensible movement of the tool change arm 268. Between the downwardly projecting forks presented by the forward portion of the tool change arm 268, the under side of the forward portion is provided with a flat way surface 272 disposed to slidably engage a flat way surface presented by the forward portion of the rack 263. Rearwardly of a vertical shoulder 273 defining the upper forward portion of the tool change arm 268, there is provided a longitudinal opening between the spaced apart, rearwardly extending forks or arms 275 and 276 integrally formed with the tool change arm 268. The under side of the rack 263 is slidably engaged by a flat way surface presented by the upper face of a rack support 278 fixedly secured between the downwardly, and rearwardly extending arms 275 and 276, integrally formed with the tool change arm 268 by means of pins 279.

The forward upper portion of the tool change arm 268 is provided with a semi-circular surface 281 disposed to cooperate with a complementary semi-circular recess 282 presented by a tool change clamp 283, pivotably secured to the forward portion of the tool change arm 268.

To accomplish this, as shown in FIGS. 3 and 6, the forward portion of the tool change arm 268 is provided with a vertical slot disposed to receive the bifurcated rearward portion of the tool change clamp 283 which is supported therein by means of a horizontally disposed pivot shaft 285 secured at its opposite ends in the vertical arms 275 and 276 of the tool change arm 268. An actuating pin 288 is fixedly secured at its opposite ends between the arms 289 and 290 integrally formed with the pivotable tool change clamp 283. With the tool grip 182 in retracted position, as represented in FIGS. 3 and 6, the arrangement is such that the actuating pin 288 fixedly carried by the movable clamp 283 is engaged by an angular cam face 292 formed at the extreme forward end of the movable rack 263. Whenever the tool grip 182 is in extended clamped position, as shown in FIG. 4, the actuating pin 288 secured to the movable tool clamp 283 is engaged by a semi-circular opening 294 that is formed in the upper forward portion of the rack 263, adjacent the angular cam face 292 presented thereby. During movement from fully retracted position, FIG. 3, to extended clamped position, FIG. 4, it will be apparent that the rack 263 is moved a slight distance relative to the tool change arm 268 as will hereinafter be more fully explained.

The tool grip 182 comprises an assembly of cooperatively disposed, major movable parts including the tool change arm 268, the rack support 278 secured to the arm 268, the rack 263 and the tool change clamp 283 pivotably secured to the arm 268. The assembly comprising the extensible tool grip 182 is supported for rectilinear slidable movement by way surfaces presented within the housing 174 and way surfaces provided by a cover plate 296 secured to the housing 174 by means of cap screws 297. As shown in FIGS. 3 and 4, the housing 174 is provided with upper and lower way surfaces 303 and 304 disposed in parallelism to engage the forward upper portion of the tool change arm 268, and the lower portion thereof. In like manner, the opposite faces of the tool change arm 268 are constrained for slidable movement between a way surface 305 formed in the housing 174, and a cooperating way surface 306 presented by the inner face of the outer support cover 296.

During movement of the tool grip 182 from fully retracted to clamped position, it is essential that the independently movable tool change clamp 283 be retained in pivoted fully open position during the first part of the movement, as shown in FIG. 3. Initially, during clamping movement, the tool change arm 268 together with the rack 263 and pivotable clamp arm 283 are retained in the position shown as they are moved rightwardly upon counterclockwise rotation of drive gear 238. As the semi-circular recess 281 presented by the tool change arm 268 is moved into proximity to the periphery of the toolholder, during rightward movement, the rack 263 is caused to move independently of the tool change arm 268 in a manner to effect the necessary pivotal movement of the clamp 283 into engagement with the toolholder. During this particular portion of the tool changing cycle, the rack 263 continues to urge both the tool change arm 268 and the separately pivotable tool change clamp 283 into clamping engagement with the toolholder, as represented in FIG. 4. With the cooperating semi-circular recesses 281 and 282 respectively presented by the tool change arm 268 and tool clamp 283 in clamping engagement with the toolholder, an outwardly projecting stop 309 secured to the rack is disposed to compress a spring 310 seated within a circular recess formed in the forward portion of the tool change arm 268. As indicated in FIG. 4, therefore, the spring 310 constitutes a resilient interconnection between the tool change arm 268 and the actuating rack 263 whenever the tool grip 182 is moved into clamping engagement with a toolholder.

Figure 15:
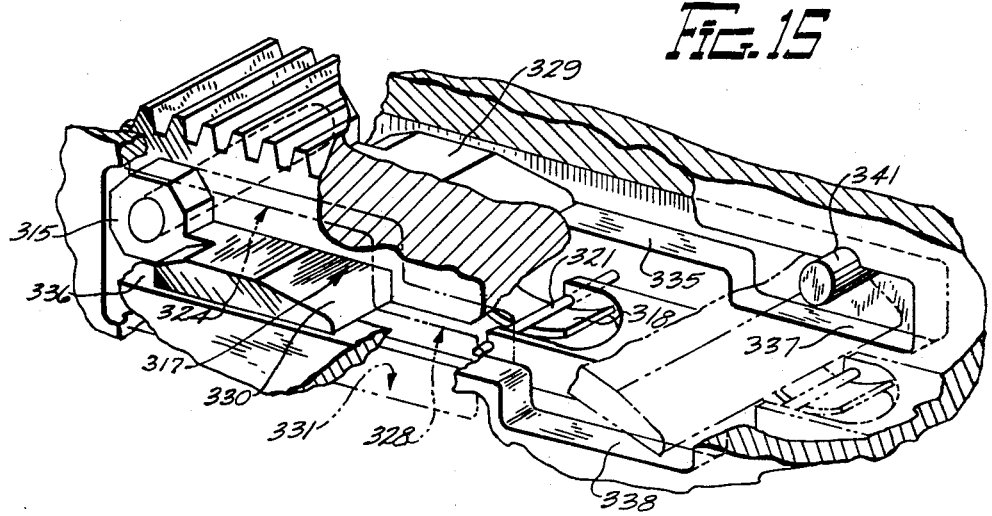
FIG. 15 is an enlarged fragmentary view in perspective, with certain parts broken away, and showing the releasable latch device for one of the tool grips.

To provide simultaneous coordinated movement of the tool change arm 268, rack 263 and movable tool change clamp at the start and first portion of a tool clamping movement, a novel latching arrangement is provided to retain the rack 263 in fixed engagement with the tool change arm 268. By maintaining the rack 263 in latched engagement with the clamp arm 268, the angular cam face 292 presented by the forward upper portion of the rack 263 is retained in engagement with the actuating pin 288 secured to the rearwardly projecting arms 289 and 290 of the pivotable clamp 283. The latching device comprises a pivoting latch plate 312 having rearwardly extending, spaced-apart arms 314 and 315 journalled to rotate about a pivot shaft 316 extending through a bored opening formed toward the rearward portion of the rack 263, as shown in FIGS. 3, 6 and 15. With the rack 263 latched to the clamping arm 268, as shown in FIGS. 6 and in solid lines in FIG. 15, the central portion of the latch cam plate 312 is pivoted upwardly to engage a rectangular recess formed in the rearward under side of the rack 263. The plate 312 is maintained in upward latching engagement by means of a curvilinear spring 318 extending therebelow within a rectangular recess 319 formed in the rearward portion of the rack support 278, FIG. 3, and extending horizontally below the under side of the rack 263. Irrespective of the longitudinal movement of the rack support 278 and the clamp arm 268, the spring 318 is retained in the rectangular recess 319 by means of a pin 321 engaged at its opposite ends in the rack support 278.

With the latched condition existing, as shown in FIGS. 6 and 15, the cam plate 312 is pivoted upwardly to engage with its forward edge the vertical edges of enlarged rectangular recesses 323 and 324, respectively formed in the central, rearward portions of the rearwardly extending guide arms 275 and 276 integrally formed with the clamp arm 268. With the central portion of the latch plate 312 engaging the horizontal recess 317 in the rack 263, as well as the vertical edges of the recesses 323 and 324 in the guide arms 275 and 276, it will be apparent that the rack 263 and the clamp arm 268 are latched together for simultaneous movement during the initial part of a clamping operation. The recesses 323 and 324 respectively formed in the clamp arms 275 and 276 are sufficiently large to accommodate the pivot arms 314 and 315 integrally formed with the latching plate 312. This arrangement is more clearly shown in FIG. 15 in the phantom lines illustrating likewise that the recesses 323 and 324 open into horizontally extending openings 327 and 328 of reduced height. As shown in FIG. 15, the recesses 324 and 328 constitute one enlarged, stepped opening having a common lower surface 331. In a similar manner, although not shown in FIG. 15, the recesses 323 and 327 respectively formed in clamp arm 275 have a common lower surface disposed in parallelism with the surface 331.

To preclude premature pivoting movement of the latch plate out of engagement with the vertical walls of recesses 323 and 324, the opposite outer edges 329 and 330 of the cam plate 312 are respectively disposed to engage horizontal cam grooves 335 and 336. The horizontal groove 335 is formed in an inner wall of the housing 174 and is disposed to open into an enlarged rectangular recess 337 formed therein as shown in FIG. 15. In a similar manner, as shown in FIGS. 6 and 15, the horizontal groove 336 is formed in the inner wall of the cover plate 296 and is disposed to open into an enlarged rectangular recess 338 formed therein. Pins 341 and 342 are respectively secured in bored openings presented by the housing 174 and cover 296, in a manner that the lower portions thereof extend slightly below the upper edges of recesses 337 and 338 to constitute semi-circular cams. The cam pins 341 and 342 are so positioned with respect to the horizontal grooves 335 and 336 as to engage the angular forward portion of the latch plate 312 during rectilinear outward movement of the rack 263 and clamp arm 268. As this occurs, the cam plate 312 is pivoted downwardly to disengage it from the vertical edges of the recesses 323 and 324 formed in the arms 275 and 276. Thereupon, with latch plate 312 pivoted downwardly as represented by the phantom line showing in FIG. 15, the rack 263 is disengaged from the clamp arm 268 for additional independent movement relative thereto.

The cam pins 341 and 342 are so positioned in the recesses 337 and 338 as to effect downward pivotable movement of the cam plate 312 immediately prior to the semi-circular opening 281 presented by the forward end of the clamp arm 268 being brought into abutting engagement with the periphery of the toolholder. Upon additional combined movement of the rack 263 and clamp arm 268, movement of the clamp arm now being effected by the spring 310 engaging stop abutment 309, the semi-circular opening 281 of the clamp arm engages the upper periphery of the toolholder. It will be apparent that engagement of the opening 281 with the toolholder prevents further outward movement of the clamp arm 268. At this time, the rack 263 is urged outwardly relative to the stationary clamp arm 268 in a manner that the semi-circular opening 294 in the rack engages the actuating pin 288 carried by the pivotable clamp 283. As this occurs, continued movement of the rack with the pin 288 engaged by semi-circular opening 294 effects pivoting movement of the clamp arm 283 into clamped engagement with the toolholder, as represented in FIG. 4. With clamping movement now effected, and spring 310 compressed by stop abutment 309, the clamping pressure is continuously maintained by means of the hydraulic piston continuing to urge gear 238 to rotate in a counterclockwise direction.

At the completion of a tool changing cycle, i.e., after the interchanged tools have been reinserted into the storage matrix and tool spindle, the respective tool grip mechanisms 181 and 182 are returned to their retracted positions shown in FIG. 3. This is accomplished automatically in response to inward movement of the rack 263, FIG. 7, thereby effecting a clockwise rotation of the gear 238 for effecting leftward movement of the rack 263, toward the position shown in FIG. 3. Initially, upon leftward movement of the rack 263 to retract the tool grip 182, the semi-circular opening 281 presented by the tool clamp arm 268 is retained in abutting engagement with the toolholder by continued operation of the spring 310 and rack stop 309. With the spring 310 urging the clamp arm 268 outwardly, leftward movement of the rack 263 effects clockwise pivotal movement of the movable tool clamp 283, this movement continuing until the angular cam face 292 presented by the upper surface of the rack reengages the actuating pin 288 carried by the movable clamp 283. During this interval, the latch plate 312 is moved out of engagement with cam pins 341 and 342 and is resiliently biased into upward latched position by operation of spring 318 and cam grooves 335 and 336. As soon as this occurs, the leftward end of the rack 263 engages a stop 345 fixedly secured to the leftward ends of arms 275 and 276 by means of cap screws. Thus, with the cam plate 312 returned into latched engagement between the rack 263 and the tool clamp arm 268, these members are returned leftwardly to the fully retracted position shown in FIG. 3 due to the rack 263 engaging stop member 345. Inward retracting movement of the tool grip 182 is limited by engagement of the stop member 345 secured to the rearward ends of arms 275 and 276 into engagement with an adjusting screw 346 engaging a suitable threaded opening in a wall of the housing 174.

During either extensible clamping movement, or retracting movement, the tool grip 181 operates in a manner identical to tool grip 182 and in coordinated synchronism therewith. To facilitate the description and simplify the drawings, however, only the major cooperating members of the tool grip 181 are identified by like reference numerals followed by the suffix T. Thus, the tool grip 181 comprises essentially a tool clamp arm 268–T provided with a bifurcated portion having secured therebetween a rack support 278–T, these two members being disposed to cooperate to slidably support the rack 263–T. The remaining cooperating parts, including the pivotal latch plate 312–T and actuating spring 318–T cooperate in a manner identical to that described for the tool grip 182. Likewise, whenever the tool grip 181 is retained in fully retracted position, as shown in FIG. 3, an angular cam surface 292–T presented by the forward end of the rack 263–T engages an actuating pin 288–T secured to the pivotable tool clamp 283–T, retaining it in open position.

As shown in FIG. 6, the movable clamp 283 is provided with spaced apart arcuately formed flanges 347A and 347B disposed to engage the opposite ends of a coded tool collar. In a similar manner, the arcuate opening 281 in the forward end of the arm 268 is provided with inwardly extending arcuate flanges, only one of which 348A is shown in the drawings. Thus, the inwardly extending arcuate flanges positively grip the coded collar 126 to prevent axial displacement of the tool whenever the tool grips 181 and 182 are moved into extended clamped position. The tools secured therein are positively restrained against axial movement in either direction, as the tools are being interchanged between the storage magazine and the tool spindle. With the storage magazine positioned as hereinbefore explained, the tool 61 and the associated holder associated therewith is positioned in predetermined spaced relationship to the retracted tool grip 181, this position being spaced above a horizontal plane intersecting the axis of the tool grip drive shaft 239. Likewise, the tool spindle 40 is bodily moved, as will hereinafter be more fully described, to position the tool carried thereby in a corresponding location with respect to the retracted tool grip 182, this position being displaced below a horizontal plane intersecting the drive shaft 239. After a tool change cycle has been completed, it will be understood that the entire tool change member 172 is pivoted 180° to effect the selected interchange of tools, resulting in the tool grips being positioned as represented in FIG. 18D. Although the tool grips 181 and 182 are represented as being in extended clamped position in FIG. 18D, it will be understood that, after the interchange is completed, the tool grips will be retracted, as depicted in FIG. 18E, in preparation for the next succeeding tool change cycle. Inasmuch as the entire tool change member is pivoted 180° for each interchange, it will be readily apparent that 180° pivotal movement is effected first in one direction for one interchange, and then in the opposite direction for the next interchange. For each successive tool change, therefore, the starting positions of the tool grips 181 and 182 will be displaced 180° with respect to their last previous starting positions.

As a prerequisite to effecting a tool changing operation, it is necessary to bodily move the entire tool spindle 40 along the X and Y axes to the proper, required position in operative proximity to the tool change mechanism 60, as shown in FIGS. 1 and 3. During this interval of moving the tool spindle bodily into the required position for a tool change, it is likewise necessary to rotate the tool spindle to a predetermined angular position in which the keyway presented thereby is in a corresponding position to the keyway in the tool storage socket. The positioning control for effecting the equiangular position of the tool spindle is a synchro 353 having a rotor connected to be driven whenever the tool spindle is rotated under power for effecting a machining operation. The power drive for rotating the tool spindle 40 is utilized both to drive the spindle for a machining operation as well as effect the desired positioning control of the spindle to a predetermined angular position in response to operation of the synchro 353. This is accomplished electrically, as will hereinafter be more fully explained, with the synchro 353 providing an error signal to effect angular positioning movement of the tool spindle 40.

As shown in FIG. 13, a variable speed hydraulic motor 354 is connected to supply the input power for rotating the tool spindle 40. Power is transmitted from the output shaft of the motor 354 to a variable speed transmission, generally identified by the reference numeral 792, via a coupling 356 connected to drive a shaft 357 journalled in bearings 358 and 359, the outer races of which are supported in suitable bored openings formed within the spindle head 37. The shaft 357 is provided with gear teeth 363 integrally formed therewith, an intermediate speed output gear 364 splined to the shaft, and a high speed output gear 364A rotatably journalled upon the shaft 357 by means of a bearing 365. An electromagnetic clutch 359 is selectively operative in a well-known manner to transmit power from the shaft 357 to drive the high speed output gear 364A.

The low speed driving gear 363 is connected to meshingly engage a gear 370 rotatably supported ky a bearing 371 upon the central portion of a shaft 372 journalled within the spindle head 37 by spaced apart bearings 373, 374 and 375. Whenever it is desired to drive the shaft 372 at the lowest driving ratio, an associated electromagnetic clutch 379 is selectively operative in a well-known manner to transmit driving power from the input gear 370 to rotate the shaft 372. The clutch 379 is provided with a driven portion fixedly secured to the splined portion 380 of the shaft 372, and is operative to effect engagement of drive plates 381, several of the plates being splined to the hub of gear 370, and several other of the plates being keyed to the driven portion of the clutch 379.

The gear 364, splined to the shaft 357, is disposed to engage the gear 383 rotatably supported upon the shaft 372 by a bearing 384 and being selectively connected in well-known manner to drive the shaft 372 by operation of an associated electromagnetic clutch 385. The high speed driving gear 364A journalled to rotate about shaft 357 engages an input gear 387 provided with a hub having internal splines disposed to operatively engage the peripheral splines 380 presented by the shaft 372. Inasmuch as the gear 387 is splined directly to the shaft 372, the high speed driving ratio is effected by selectively activating the electromagnetic clutch 369. It will be apparent that only one of the electromagnetic clutches including 369, 379 and 385 is energized to effect the appropriate desired driving ratio of shaft 372. For example, with clutch 369 energized to drive shaft 372 at the high speed ratio, clutches 379 and 385 are deenergized. In a similar manner to drive the shaft 372 at the lowest speed ratio, clutches 369 and 385 are deenergized while clutch 379 is energized to effect the low speed connection. Actually, the clutches 369, 379 and 385 are respectively adapted to provide three separate range changes, with appropriate speed changes in each range being effected by selective operation of the input motor 354.

For driving the tool spindle 40 at a selected speed in the desired range, an output gear 389 splined to the leftward end of shaft 372 engages a gear 390 that in turn is splined directly to the central portion of the tool spindle 40.

For maintaining the proper angular relationship between the rotor of the synchro 353 and the tool spindle 40, the synchro 353 is disposed to be rotatably driven by a direct gear connection irrespective of the selected rate of tool spindle movement. To accomplish this, an output gear 392 is fixedly secured to the rearward end of the spindle drive shaft 372. The gear 392, in turn, engages a cooperating gear 393 fixedly pinned to the inner end of a stub shaft 394, the latter being rotatably supported by bearings 395 having their outer races constrained within a suitably bored opening in a cover plate 396 secured to the spindle head 37. The stub shaft 394 is connected via a flexible coupling 401 to drive the rotor shaft of the synchro 353, the stator of which is secured directly to a supporting web integrally formed with, and spaced rearwardly from the cover plate 396. It will be apparent, therefore, that the rotor of the synchro 353 is continuously driven via flexible coupling 401, stub shaft 394, gears 393 and 392 by the shaft 372; the latter being directly connected via splined output gear 389 to the gear 390 which in turn is splined directly to the tool spindle 40. By means of this arrangement, the rotor of the synchro 353 is continuously maintained in the proper angular relationship to the tool spindle 40. Likewise, by means of this arrangement, the entire timing control arrangement including the synchro 353 can be directly removed from the machine by withdrawing cam screws 402 to remove the rear cover plate 396, the latter constituting a support for the interconnected parts of the timing control device.

The tool spindle 40 is journalled to rotate within the spindle head in a pair of front spindle bearings 405, and a pair of rearwardly spaced spindle bearings 406.

The outer races of the front spindle bearings 405 are seated within a circular flanged opening formed in the spindle extension 39, and are secured therein by means of a bearing retainer 407 fixed to the front end of the spindle extension 39 by means of peripherally spaced cap screws 408. The outer races of the spindle bearings 405 are maintained in proper axially spaced relationship by means of a tubular spacing collar 409. In a similar manner, a flanged shoulder toward the front end of the spindle 40 is adapted to receive the inner races of bearings 405, separated by a tubular spacer 411. Clamping pressure for retaining the spindle 40 in engagement with the bearings 405 is exerted by a rearward tubular spacer 412, the hub of gear 390, a spacing washer 413, the inner races of bearings 406, and a spacer 414 seated against a clamp nut 415 threaded directly on the rearward end of the spindle 40. A flanged collar 418 is threaded on the spindle rearwardly of the adjustable clamp nut 415. Thus, the entire spindle assembly including the flanged collar 418 as well as the parts spaced forwardly therefrom are rotatable as a single unitary structure upon rotation of the spindle drive gear 390.

As shown in FIGS. 13 and 13A, a circular plate 417 is fixedly secured to the front end of the tool spindle 40. The plate 417 is provided with a circular opening adapted to receive the shank of a toolholder and a keyway 419 adapted to be releasably engaged by a toolholder key 87 in a manner that interengaging abutment faces are provided for establishing a positive driving connection between the tool and the tool receiving spindle. For releasably retaining a tool in operative engagement with the tool spindle 40 a power actuated tool retaining means is provided which in this particular instance is a power operated expansible split collet 422. The forward end of the tool spindle is provided rearwardly of the plate 417 with a bored tapered opening 420 adapted to receive the complementary tapered periphery 421 of an axially movable split collet 422. To permit a slight forward axial movement of the collet 422 into released position, the front end thereof is spaced a slight distance rearwardly from the inner face of the spindle plate 417. Normally, as will hereinafter be explained, the collet 422 is resiliently biased toward an inner clamped position, as shown in FIG. 13. Toward its rearward end, the collet 422 is provided with a keyway disposed to be slidably engaged by the inner end of a set screw 423 threadedly engaged in a radially tapped opening in a peripheral wall of the tool spindle 40. In axially forward released position, as well as during axial movement in either direction, the collet 422 is retained in fixed angular relationship to the spindle 40 by means of a set screw 423. In its axially rearward clamped position, as shown in FIG. 13, the collet is retained in fixed angular position both by the set screw 423 and the clamped engagement between the complementary tapers respectively presented by the collet 422 and the tool spindle 40. To effect clamping movement, the collet is provided with a plurality of peripherally spaced, longitudinally extending slots [not shown] in well-known manner. To provide a positive driving connection between a tool and the spindle 40 during rotational movement thereof, the key 87 secured to the toolholder is adapted to be retained in engagement with the complementary keyway 419 presented by the spindle plate 417 by clamping engagement of the collet with the shank of the toolholder. Thus, with a milling tool fixedly clamped to the tool spindle 40 by means of the collet 422, as shown in FIG. 13, the spindle 40 operates to positively drive the milling cutter during a machining operation. This arrangement provides both a coaction between the tapered, mating surfaces presented by the collet and tool spindle to concentrically align a cutter with the axis of spindle rotation; and a clamped engagement with the tool to maintain a positive drive by means of the interengaged key and keyway. In other words, this particular arrangement provides the advantages of both a keyed positive drive together with the quick release permitted by the axially movable split collet 422.

For releasing a tool prior to a tool change, the collet 422 is urged axially forward permitting the resiliently biased split collet to expand slightly in a manner that a tool can be axially retracted from the tool spindle 40. After a tool interchange has been completed, and the interchanged tool inserted into the collet, the collet 422 is urged axially in a rearward direction in a manner to positively clamp the selected tool in driving engagement with the tool spindle 40. Immediately prior to rearward axial movement of the collet 422 taking place, the tool is being inserted into the disengaged collet 422. As this occurs, the beveled inner end of the key 87 engages the keyway 419 to effect a slight necessary angular alignment of the tool within one or another of the tool grips 181 or 182, thus permitting the key 87 to move into exact registration with the keyway 419. As this occurs, as will hereinafter be more fully explained, inserting movement of the tool is likewise connected to disengage the dynamic angular positioning effect of the spindle positioning synchro 353. After this, with proper alignment existing between the tool and the spindle, and with the toolholder fully inserted into the unclamped collet, the collet is urged rearwardly to effect the necessary clamping engagement.

For effecting selective axial movement in either direction, the inner, rearward end of the collet 422 is threadedly engaged with the forward end of a rearwardly extending tubular draw-in-rod 426. The tubular rod 426 extends through an axially extending bored opening in the spindle 40, and has secured to its rearward end a threaded abutment collar 427. A resiliently expansible stack of disk springs 428 is seated between thrust collars 429 and 430 the opposite ends of which respectively abut the end of the tool spindle 40 and the inner face of the abutment collar 427. Thus, the springs 428 are normally operative to urge the collar 430 and abutment collar 427 rearwardly relative to the spindle 40 to effect corresponding inward movement of the tubular draw-in-rod 426, thus maintaining the collet in clamped engagement with the toolholder. To release the collet, prior to effecting a tool changing operation, it is necessary to urge the abutment collar 427 axially forward, compressing the disk springs 428, and effecting forward movement of the tubular rod 426 and collet 422 to released position. In order to prevent damaging the spindle bearings during an automatic tool release, there is provided an axially floating release mechanism 434 operative to simultaneously urge the flanged collar 418 and collar 427 in directions to compress the disk springs 428 therebetween. To accomplish this, the release mechanism comprises a cylinder 437 carried for axial movement within spaced apart bored openings 439 and 440 formed in transverse webs within the spindle head 37. The cylinder 437 is adapted to carry a tubular extension 438 provided with an inwardly extending flanged end disposed to overlie the flange presented by the collar 418. At its rightward end, the cylinder 437 is provided with a flanged cover 443 secured thereto by means of cap screws 444. The cylinder cover 443 is resiliently urged inwardly relative to an end cover 445 secured to the spindle head 37 by cap screws 454. To this end, each of the peripherally spaced cap screws having pilot extensions engaging one end of peripherally spaced springs 453 seated at their opposite ends in circular recesses formed in the end plate 445. The springs normally urge the cylinder 437 to move leftwardly in a manner that the flange of extension 438 is not engaging the flanged collar 418. As hereinbefore explained, the flanged collar 418 is threadedly secured to the rearward end of the tool spindle 40 and is disposed to rotate therewith during a machining operation. Normally, therefore, the flanges respectively presented by the spindle collar 418 and the cylinder extension 438 are not in direct abutting engagement.

Spaced in rightward concentric relationship to the thrust collar 427 is the leftward end 446 of a piston 447 slidably carried for axial movement within a cylindrical opening 448 formed in the cylinder 437. A collar 449 secured to the rightward end of the stepped diameter piston 447 is provided with an actuating rod 450 extending outwardly through a bored opening in the end plate 445 to actuate a switch 451. For releasing the collet 422, hydraulic fluid under pressure is admitted via a supply line 455 to effect leftward movement of the piston 447 and corresponding leftward movement of the leftward end 446 thereof into engagement with the thrust collar 427. As this occurs, continued pressure through supply line 455 effects movement of the piston end 446 and cylinder extension 438 in opposite directions to compress the stack of disk springs 428 and urge the collet 422 axially outward to disengaged position. Thus, during disengagement of the collet 422, pressure fluid through line 455 effects rightward movement of the cylinder 437 to urge the flanged end of extension into abutting engagement with the flanged collar 418 in opposition to leftward movement of the left end of the piston 447 against the thrust collar 427 to compress the springs. During disengagement of the collet 422, therefore, neither the piston 447 nor the cylinder 437 exert any end thrust on the spindle bearings.

At the completion of a tool change cycle, with the interchanged tool inserted within the collet clamp 422, the pressure fluid is disconnected from inlet line 455, with fluid now being admitted via a line 456 to effect rightward retracting movement of the tubular piston 447, with the disk springs 428 now functioning to urge the tubular draw-in-rod 426 rightwardly for reclamping the collet 422. As this occurs, springs 453 urge the cooperating cylinder 437 bodily in a leftward direction as limited by a shoulder adjacent bored opening 439.

The tool spindle 40 is adapted to receive a toolholder carrying a milling cutter or drill, as represented in FIGS. 2 and 13, and also is adapted to receive a tap, as shown in fragmentary form in FIG. 14. In either case, the tubular draw-in-rod 426 is resiliently biased into clamping engagement with a toolholder by operation of the disk springs 428, FIG. 13. Likewise, to release the collet clamp 422 prior to effecting a tool change, the piston 447 is movable in a leftward direction to effect axial movement of the tubular draw-in-rod 426 in the leftward direction.

As represented in FIG. 14, a toolholder adapted to support a tap comprises essentially a tubular body portion 459 threaded at its opposite ends to receive supporting plugs 460 and 461, each being provided with a concentrically aligned bored opening adapted to slidably support a tool carrying shaft 463. A collar 468 pinned to the central portion of the shaft 463 is normally retained in abutting engagement between the inner faces of resiliently biased cup faced thrust washers 469 and 470. The collar 468 is provided with radial arms engaging longitudinal slots to effect a positive drive to shaft 463. Springs 473 and 474 seated at their outward ends against the plugs 460 and 461 are seated at their inner ends within tubular recesses formed within the cup shaped washers 469 and 470 in a manner to normally urge the collar 468 and the tool supporting shaft 463 to a central intermediate position. At its forward end, the shaft 463 is provided with a releasable toolholder 475 for securing a tap to the shaft for corresponding axial movement therewith.

Whenever a tap holder, such as the holder 458 in FIG. 14, is secured within the collet 422 provided in the spindle 40, the rearward end of the axially movable shaft 463 is moved into abutting engagement with the end of an axially movable tap control rod 478 extending longitudinally through a bored opening formed in the tubular draw-in-rod 426. The control rod 478 is slidably supported for axial movement within a pair of spaced apart tubular bushings 479 and 480 secured within the opposite ends of the tubular draw-in-rod 426. To limit axial movement of the control rod 478, the central portion thereof is enlarged slightly to provide shoulders 481 and 482 respectively coacting with adjacent abutments to limit the extent of movement in either direction. The extreme rightward end of the rod 478 extends within a pilot bearing 483 carried within a circular bored opening in the enlarged end of an axially movable pilot rod 484, FIG. 13. The pilot rod 484 is guided for axial movement by a tubular sleeve bearing 486 secured within the inwardly extending portion 485 of a tubular support housing 487. The transverse end plate 445 secured to the rearward portion of the spindle head 37 by cap screws 454 is provided with a bored opening adapted to support the tubular housing within an axially bored opening through the tubular control piston 447. Thus, the pilot rod 484 is maintained in concentric operative relationship to the end of the axially movable control rod 478. A pin 490 fixed at its opposite ends in the wall of the tubular housing 485 is disposed to engage slotted openings in the pilot rod 484 to restrain the rod against rotational movement. The outer end of the control pilot rod 484 is threadedly engaged with the inner end of an actuating plunger 493 carried for axial movement by a lineal potentiometer 494, the latter being fixed to a cover secured to the outer end of the tubular housing 487. A spring 495 is seated within a bored opening extending partially through the pilot rod 484, and is seated at its rightward end against the pin 490. At its opposite end, the spring 495 is seated against a plug threaded in the leftward end of the bored opening formed in the pilot rod 484. Thus, the rod 484 is urged leftwardly by spring 495. The arrangement is such that the force exerted by spring 495 plus spring 474 is substantially equal to the opposing force exerted by the single spring 473 in the tap holder 458.

Whenever a tapping toolholder 458 is operatively secured within the tool spindle 40, FIG. 14, the rightward end of an axially floating shaft 463 is brought into abutting engagement with the leftward end of the tapping control rod 478 with sufficient force to compress the spring 495 contained within the pilot rod 484. Thus, at the start of the tapping operation, the collar 468 secured to the tapping support shaft 463 is normally biased into its central neutral position with respect to the toolholder 458, the spring 473 exerting sufficient pressure to compress the spring 495 in the pilot rod 484. Any further movement of the shaft 463 in either direction from its normal floating central position effects a corresponding axial movement of the control rod 478 and pilot rod 484 with a consequent actuation of the lineal potentiometer 494. As will hereinafter be more fully explained, the lineal potentiometer 494 is operatively connected to effect a continuous modulating type control of the axial feeding rate of the tool spindle 40 during a tapping operation. Thus, the proper relationship is always maintained between rotational speed of the spindle for effecting a tapping operation and the axially outward feeding movement thereof.

Figure 16:
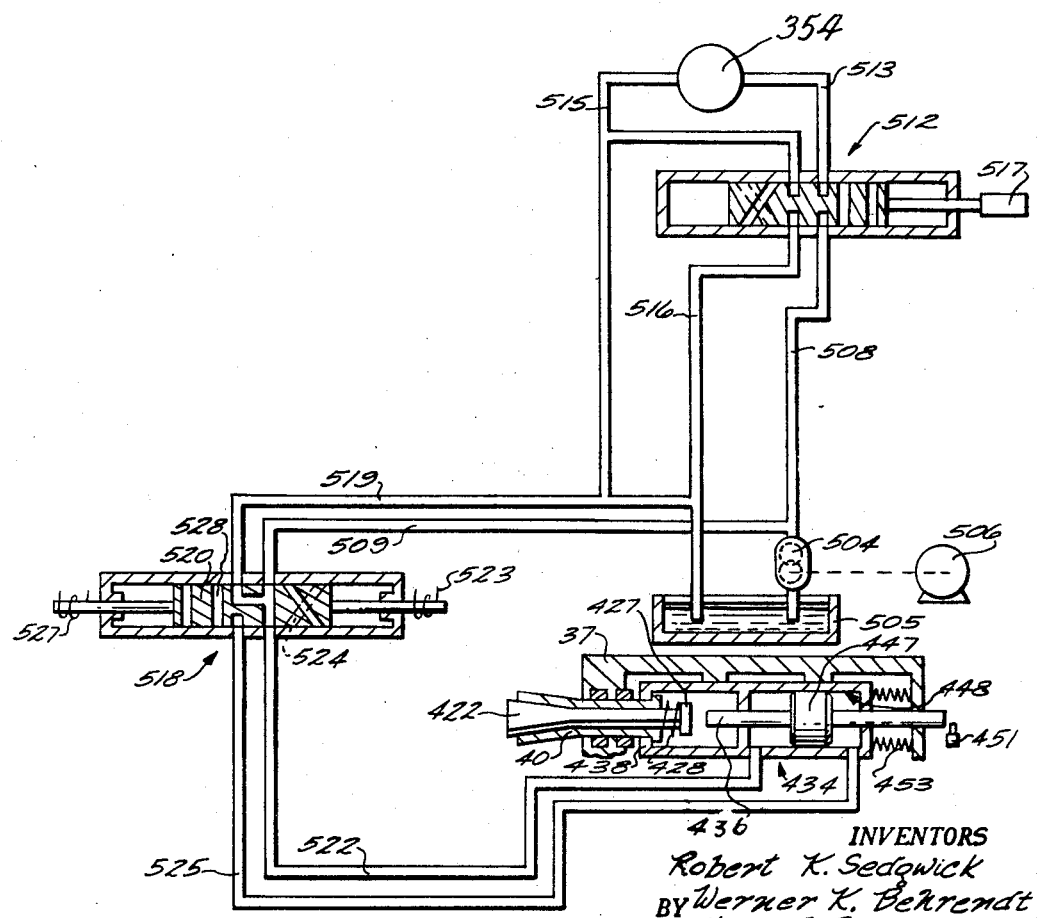
FIG. 16 is a schematic hydraulic circuit diagram illustrating the control for the tool spindle motor and the collet release mechanism.

As shown in FIG. 16, there is provided a hydraulic circuit for operating the tool spindle motor and the collet release mechanism. Hydraulic fluid under pressure is withdrawn by a pump 504 driven by a motor 506 from a sump 505 to supply fluid under pressure to lines 508 and 509. A servo control valve 512 is schematically represented as interconnected between the pressure supply line 508 and a supply line 513 connected to a hydraulic motor 354. Another hydraulic conduit 515 is connected between the motor 354 via the servo control valve 512 to a return line 516. The servo control valve 512 is operative in well-known manner under the control of a motor 517 to selectively vary the rate of rotation of the spindle motor 354. The motor 517 is likewise connected, as will hereinafter be more fully explained, to operate the motor 354 at a preselected speed, with an error signal being connected to maintain substantially constant speed. From the pump 504, the conduit 509 is connected to supply fluid under pressure to the inlet port associated with a control valve 518 for the collet clamp release mechanism. Another port of the control valve 518 is connected via hydraulic line 519 to the exhaust line 516. With a valve spool 520 of the control valve 518 in a central neutral position as shown in FIG. 16, the inlet pressure line 509 is connected via a port in the valve spool to an outlet line 522, as well as the exhaust line 519. Thus, fluid under reduced pressure from line 522 flows into the cylinder 448 to retain the piston 447 in a rightward position relative to its cooperating cylinder 448, permitting the springs 453 to urge the cylinder 437 leftwardly. Energization of a solenoid 523 effects leftward movement of the valve spool 520 thereby connecting the pressure supply conduit 509 via a valve cannelure 524 to a hydraulic line 525. At the same time, with the valve spool 520 in leftward position, the hydraulic line 522 is connected via another cannelure in the valve spool to the exhaust line 519. With this condition existing, the admission of pressure fluid from line 525 into cylinder 448 effects leftward movement of the piston 447 until the extreme leftward end thereof is moved into abutting engagement with thrust collar 427. Thereafter, continued pressure effects movement of the piston 447 and cylinder 448 in opposite directions in a manner that the flange 438 abuts the flange secured to the rearward portion of the tool spindle 40. Consequently, spring 428 is compressed and a spring collet 422 is urged leftwardly a slight distance relative to the tool spindle 40 to release a tool secured therein. Whenever the spring collet is to be reclamped for securing a tool in operative engagement with the tool spindle 40, the solenoid 523 is deenergized and a solenoid 527 energized to effect movement of the valve spool 520 to its extreme rightward position. With the valve spool 520 in rightward position, fluid from the rightward end of the cylinder 448 is exhausted via line 525, a cannelure in the rightwardly moved valve spool 520 to the main exhaust line 519. At the same time, pressure fluid from supply line 509 flows through a cannelure 528 in the valve spool to the line 522, the pressure fluid through hydraulic line 522 effects rightward movement of the piston 447 relative to the cylinder 448 to disengage the leftward end 446 thereof from abutting engagement with the thrust collar 427. With this condition existing, the springs 453 operate to effect a slight leftward movement of the cylinder 448 relative to the supporting spindle head 37 in a manner to move the flanged extension 438 out of engagement with the flange secured to the spindle 40. The flange 438 is normally moved leftwardly a sufficient distance to permit rotational movement of the spindle 40 and the flange secured thereto.

Figure 17:
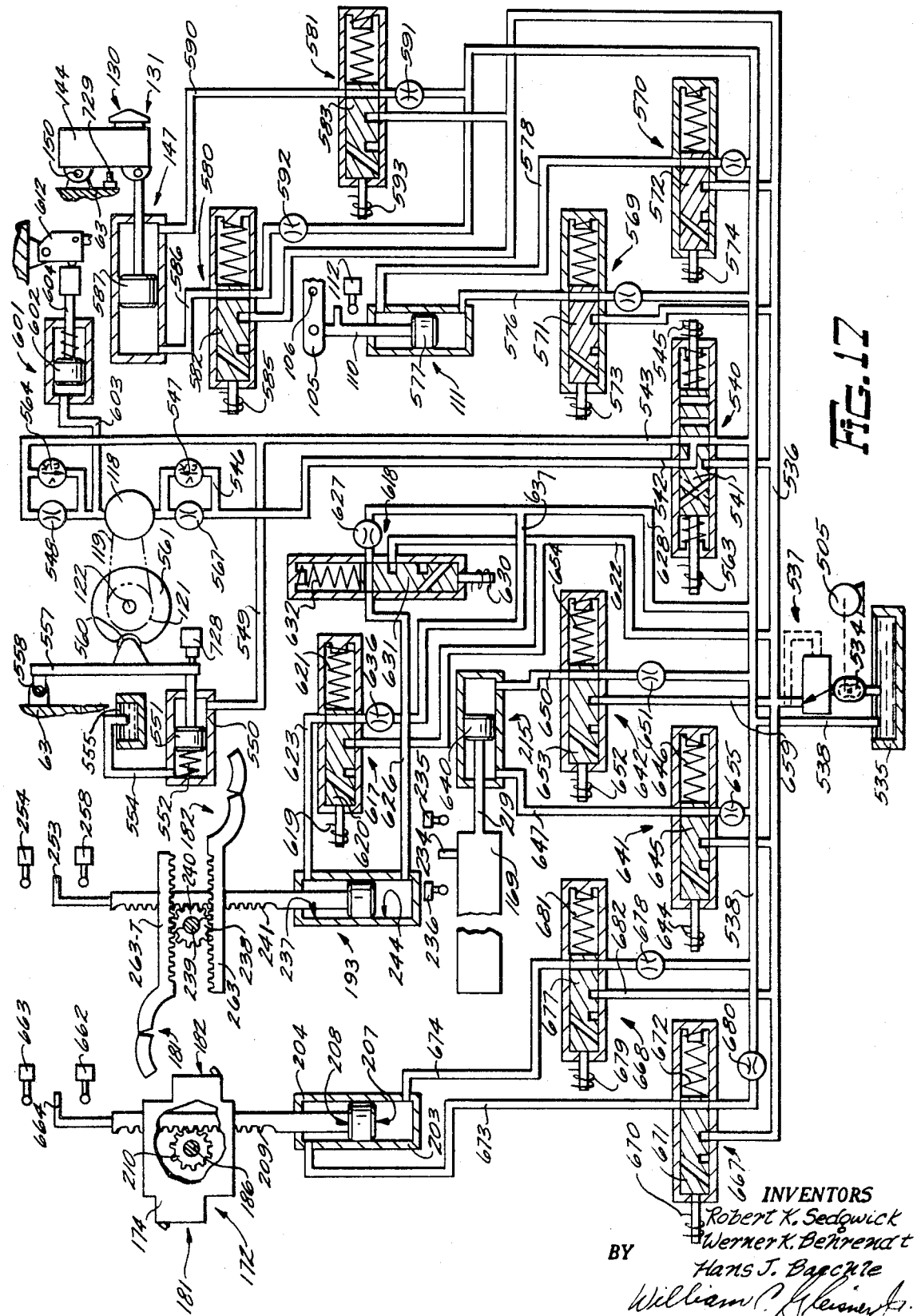
FIG. 17 is a schematic hydraulic diagram illustrating the electro-hydraulic control system for effecting a tool change.

As schematically represented in FIG. 17, there is provided a hydraulic control circuit for operating the tool storage magazine to move a preselected tool into position, as well as for effecting proper sequential movement of the various parts of the tool change mechanism 60. As there shown, a pump 534 driven by the motor 506 is connected to withdraw hydraulic fluid from a sump 535, providing fluid under pressure to a main supply line 536. A pressure regulating valve 537 is interconnected between the pump 534 and the line 538 in well-known manner to supply fluid under uniform pressure. At the same time, an exhaust line 538 is continually connected to exhaust fluid to the sump 535. For effecting the required rotational movement of the tool storage magazine, the drive motor 118 therefore is under the control of a solenoid actuated valve 540. With the valve spool 541 of the control valve 540 biased to its central neutral position, as shown, both sides of the drive motor 118 are connected via hydraulic lines 542 and 543 through cannelures in the valve spool to the main exhaust line 538. Energization of a solenoid 545 effects leftward movement of the valve spool 541, connecting pressure supply line 536 via a groove in the valve spool to supply line 542. Pressure fluid then flows from the line 542 via a line 546 and an open check valve 547 to actuate the hydraulic motor 118. For controlling the rate of rotation of motor 118, fluid is exhausted therefrom via an adjustable flow control valve 548 connected through the line 543, a cannelure in the valve spool 541 to the exhaust line 538.

Upon starting rotation of the motor 118 in either direction, pressure fluid from line 543 flows through a line 549 to a cylinder 550, effecting movement of a piston 551 in opposition to a spring 552. Provision is made for any fluid by-passing piston 551 to flow outwardly through a line 554 to a sump 555 connected in well-known manner to return fluid to the common sump 535. Leftward movement of the piston 551 effects corresponding leftward movement of the outer end of a lever 557 pivoted at its opposite end about a shaft 558 carried by the supporting frame 63. Toward its central portion, the lever 557 is provided with a cam roller 560 normally disposed to be urged into engagement with a circular recess presented by a rotatable cam plate 561 by operation of spring 552. The cam plate 561 is disposed to rotate 360° for each 18° rotation of the tool storage magazine, FIG. 1. Thus, as each succeeding tool carried by the magazine passes through the tool change ready station, the circular recess presented by cam plate 561 is moved into a position to be engaged by the outwardly retracted cam roller 560. Thus, upon deenergizing solenoid 545 to return valve spool 541 to neutral position, both of the motor supply lines 542 and 543 are connected to exhaust to permit stopping of the motor 118 for positioning the preselected tool in close proximity to the tool change ready station. As this occurs, since line 549 is now connected to exhaust, spring 552 operates to urge piston 551 rightwardly to urge the cam roller 560 into engagement with the circular recess presented by the cam 561 to effect final positioning of the preselected tool in the tool change ready station.

Rotation of the motor 118 may be effected in a reverse or counterclockwise direction by energizing a solenoid 563 to effect rightward movement of the valve spool 541, connecting pressure supply line 536 to the line 543. Thereupon, the flow of pressure through line 543 enters line 549 effecting retracting movement of cam roller 560, and continues through an open check valve 564 to effect reversed rotation of the motor 118. The flow of return fluid from motor 118 continues through a flow control valve 567, conductor 542 and thence through the rightwardly urged valve spool 541 to the main exhaust line 538. Deenergization of solenoid 563 permits return movement of valve spool 541 to central neutral position connecting both of the motor supply lines 542 and 543 to exhaust. Final positioning of the tool storage magazine, upon stopping motor 118, is again effected by resiliently urged rightward movement of the lever 557, and cam roller 560 into engagement with the cam recess presented by cam plate 561.

Upon stopping of the tool storage magazine for positioning a preselected tool in the tool change ready station, as hereinbefore explained, it is necessary to both latch the magazine in selected position, and actuate the associated tool clamp to its released position in preparation for subsequent retracting movement of the preselected tool. The mechanism for accomplishing this is represented in FIG. 2 in which the latching lever 105 is carried for a clockwise rotation into engagement with ring gear 103, and at the same time is operative to effect axial movement of rod 114 to pivot tool clamp lever 91 in a clockwise disengaged direction. As shown in FIG. 17, the hydraulic cylinder operative to effect this result is under the control of valves 569 and 570. Normally, as shown in FIG. 17, the valve spools 571 and 572 respectively associated with valves 569 and 570 are urged leftwardly to connect both ends of the cylinder 111 to the main exhaust line 538. For retaining the latching lever 105 in disengaged, retracted position during rotational movement of the magazine, a solenoid 573 is energized to effect rightward movement of the valve spool 571, thereby connecting pressure supply line 536 via the rightwardly moved valve spool 571 to a line 576. Admission of pressure fluid from line 576 to cylinder 111 effects movement of piston 577 in a manner to move the piston rod 110 for effecting counterclockwise movement of the arm 105 to actuate switch 112. Upon arrival of a preselected tool at the tool change ready station, solenoid 573 is deenergized, returning valve spool 571 to resiliently urged leftward position, connecting line 576 to exhaust. At the same time, a solenoid 574 associated with valve 570 is energized to effect rightward movement of the valve spool 572, connecting pressure supply line 536 to supply pressure fluid to a line 578. The fluid pressure from line 578 to cylinder 111 effects movement of piston 577 in the opposite direction to pivot the arm 105 in clockwise direction, FIG. 2, thereby latching the tool storage magazine in the selected position, and releasing the tool clamp lever 91, FIG. 2.

Prior to effecting a tool change, the code actuated switching mechanism 131, FIG. 2, is pivotably retracted in a manner to withdraw the switch actuating leaves from engagement with the grooved rings presented by the coded collar 126. As shown in FIG. 17, this is accomplished by operation of switch retracting cylinder 147 which is responsive to electrical activation of solenoid controlled valves 580 and 581. As shown in FIG. 17, both ends of the cylinder 147 are connected to exhaust since valve spools 582 and 583 respectively associated with valves 580 and 581 are resiliently retained in leftward positions. During rotational movement of the tool storage magazine, the switch mechanism 131 is pivoted outwardly in a manner that the switch actuating leaves 130 carried thereby impinge upon the circular path of travel of the successive coded collars associated with each of the tools in the storage magazine. With this condition existing, a solenoid 585 is energized, effecting rightward movement of valve spool 582 to connect the pressure supply line 536 to a hydraulic line 586. Pressure fluid from line 586 enters cylinders 147 effecting rightward movement of piston 587 for maintaining the coded switch control mechanism 131 in outward operating position relative to the coded collars. It will be noted that during initial rightward movement of the piston 587, the opposite end of cylinder 147 is connected to line 590, the leftwardly moved valve spool 583, and thence through an adjustable flow control valve 591 to the main exhaust line 538. With this arrangement, the flow control valve 591 is preset to regulate the rightward movement of piston 587 for moving switch mechanism 131 to outward operating position.

Upon arrival of the preselected tool in the tool change ready station, the solenoid 585 is deenergized permitting leftward movement of valve spool 582, thereby connecting hydraulic line 586 to exhaust via another flow control valve 592. Simultaneously therewith, solenoid 593 is energized to effect rightward movement of valve spool 583 connecting pressure supply line 536 to line 590 for urging the piston 587 leftwardly to retract the switch mechanism from its operating position. Retracting movement is regulated by the reduced flow of fluid from the opposite end of cylinder 147 via return line 586 and the flow control valve 592 to the main exhaust line 538.

It will be recalled that each of the tool clamps associated with the various tools carried by the tool storage magazine operates with sufficient force to prevent accidental displacement of a tool from a storage socket during rotation of the magazine. Likewise, the tool clamps operate with sufficient force to prevent manual withdrawal of a tool from the magazine after rotation thereof has been stopped. To permit manual withdrawal of any tool from the storage magazine for the purpose of inserting a different tool, therefore, there is provided a manual tool change station that is spaced apart from the automatic tool change ready station. With the magazine positioned as hereinbefore described with reference to FIGS. 2 and 17, the manual clamp release may be operated to withdraw a tool from the storage drum. Referring particularly to FIGS. 11, 12 and 17, a hydraulic cylinder 601 is secured to the frame 63 in proximity to a manual tool change station that is spaced apart from the automatic tool change station represented adjacent the tool change mechanism 60 in FIG. 1. Whenever pressure fluid under pressure is admitted to hydraulic line 542 or 543 to rotate the magazine drive drum 118, as shown in FIG. 17, a hydraulic line 603 is connected to transmit pressure fluid to the cylinder 601 for urging a piston 602 outwardly. With this condition existing, a piston rod 604 is urged outwardly to positively retain a pivotal release lever 605 in its counterclockwise position about a pivot axis 606. It will be apparent that the opposite end of the release lever 605 is then retained in disengaged position relative to tool clamp 91 carried by the tool storage magazine 62 during rotational movement thereof. Upon arrival of the magazine in preselected position, as hereinbefore explained, the hydraulic line 603, as well as associated motor control lines 542 and 543 are connected to exhaust. During this period, with drum rotation stopped, a resiliently actuated plunger 609 carried within a bored opening in the frame 63 operates to maintain release lever 605 in its counterclockwise position. In the event it is now desired to change a tool, a foot treadle 610 is depressed, urging a pivotably connected link 611 downwardly. At its upper end, the link 611 is pivoted to a release cam 612 that is pivotably secured to the frame 63. Thus, downward movement of the foot treadle 610 actuates link 611 and release cam 612 in a manner to rotate the release arm 605 in a clockwise direction, thereby moving the lower end of the arm into engagement with the automatic tool latch arm 91. Thus, with the treadle 610 retained in downward position, the arm 605, FIG. 12, is pivoted in clockwise direction in opposition to piston rod 604 and plunger 609 to pivot the tool latch arm 91 journalled in the storage matrix 62 in a counterclockwise direction. As this occurs, the arcuate tool latch 94 is withdrawn from the groove 97 permitting manual withdrawal of a tool associated with the toolholder 614. In a preferred embodiment of this invention, the location of manual tool change station is general indicated by the reference numeral 615 in FIG. 1, approximately 180° from the automatic tool changing station. The arrangement described permits a manual change of tools for reloading the storage magazine only when the magazine is in a stationary, non-rotating position.

As shown in FIG. 17, the hydraulic cylinder 193 for controlling extensible movement of the tool grips 181 and 182 is connected to be activated by valves 617 and 618, respectively. The cylinders 203 and 204 are operative to pivot the tool change member from 0° position, FIG. 18B, to the 180° position, FIG. 18D, or to return the tool change member from the 180° position to the 0° position.

With tool grips 181 and 182 positioned as shown in FIG. 17, both ends of cylinder 193 are connected to exhaust by the deactivated valves 617 and 618. Whenever the tool grips are fully retracted within the tool change member, a solenoid 619 is energized to move a valve spool 620 in opposition to spring 621, thereby connecting pressure line 536 via a line 622, a cannelure in the valve spool, and thence via a line 623 to the bored opening 237 to urge the rack piston downwardly, moving the cam plate 253 into actuating engagement with a limit switch 254. As this originally occurs, pressure fluid from bored opening 244 is exhausted via a hydraulic line 626, deactivated valve 618, through a flow fluid control valve 627 and a common line 628 connected to the main exhaust line 538.

Movement of the tool grips 181 and 182 from retracted to extended clamped position is effected upon deenergization of solenoid 619 and energization of solenoid 630, the latter being operative to urge valve spool 631 in opposition to spring 632. With the valve 617 deactivated, pressure fluid from bored opening 237 is exhausted via line 623, the leftwardly moved valve spool 620, a flow control valve 636 and line 637 connected to the common exhaust line 628. At this time, the flow of exhaust fluid from cylinder 237 is operative to control the movement of tool grips 181 and 182 into extended clamped position. This occurs upon flow of pressure fluid from the main supply line 536, line 622, the upwardly moved valve spool 631 of energized valve 618, and thence via line 626 to bored opening 244, effecting movement of the rack piston, and movement of the cam plate 253 into engagement with limit switch 258.

After the tool grips 181 and 182 are moved into clamping engagement with the tools to be interchanged, the necessary outward movement of the carriage 169 is effected by actuation of cylinder 215. A piston 640 carried within cylinder 215 is shown in its central neutral position, with the opposite ends of the cylinder connected to exhaust via deactivated control valves 641 and 642. At the start of a tool change cycle, the piston 640 is retained in rightward position as the tool grips 181 and 182 are brought into clamping engagement with the respective tools. This condition is established by energization of a solenoid 644 to effect rightward movement of a valve spool 645, of the valve 641, in opposition to spring 646, thereby connecting the main supply line 536 to supply fluid pressure to a line 647 connected to the leftward end of cylinder 215. With pressure admitted to cylinder 215 from line 647, piston 640 is maintained in rightward position, with the cam dog 234 secured to the carriage 169 being retained in engagement with switch 235. Whenever the piston 640 is retained in its rightward position, the rightward end of cylinder 215 is connected via an outlet line 650 and thence through the deactivated control valve 642 and a flow control valve 651 to the exhaust line 538.

After the tool grips 181 and 182 are moved into clamping engagement with the tools and limit switch 258 is activated, the carriage 169 is moved to its extreme outward position by corresponding outward movement of the piston 640. To accomplish this, solenoid 644 of valve 641 is deenergized, and a solenoid 652 of the valve 642 is energized. With solenoid 644 deenergized, the leftward end of cylinder 215 is connected to exhaust via line 647, through the leftwardly moved valve spool 645, and flow control valve 655 to the exhaust lines 538. The flow control valve 655 is operative to regulate the speed with which the piston 640 moves leftwardly to move the carriage 169 to its extreme outward position.

With the leftward end of cylinder 215 connected to exhaust via line 647, energization of solenoid 652 completes a hydraulic connection from main supply line 536, a line 659, the rightwardly moved valve spool 653 and a line 650 connected to effect leftward movement of piston 640. As soon as the carriage 169 reaches its extreme outward position, represented by the phantom line showing in FIG. 7, the cam 234 secured to the carriage 169 engages switch 236. As will hereinafter be more fully explained, activation of switch 236 initiates the 180° pivotal movement of the tool change member to move the tools into interchanged position.

As shown in FIGS. 5 and 17, a pair of limit switches 662 and 663 are respectively operative to indicate the pivoted position of the tool change member 174. The switches 662 and 663 are secured in spaced apart relationship to the front face of the carriage 169 in a position to be respectively actuated by a dog 664 secured to the rearward face of the tool change housing 174. At the start of a tool changing operation, it will be assumed the tool grip 181 is positioned in proximity to the storage magazine and the tool grip 182 is positioned in proximity to a tool carried by the tool spindle, as shown in FIG. 4. With this condition existing, the dog 664, FIG. 5, is disposed to activate switch 662. Referring now to FIG. 17, the tool change member 172 is shown in a central neutral position under control of the gear teeth 210 integrally formed on the periphery of the tubular shaft 186 engaging the actuating rack 209. The pistons 207 and 208 controlling rack movements are responsive to activation of control valves 667 and 668, respectively.

With the tool change member and associated tool grips positioned as shown in FIGS. 4 and 18B, hydraulic fluid under pressure is admitted to cylinder 204 urging the piston 208, FIG. 17, downwardly in a manner that the dog 664 engages limit switch 662. This condition is effected by energizing a solenoid 670 to move a valve spool 671 rightwardly in opposition to a spring 672, connecting the pressure supply line to a line 673. Movement of piston 208 downwardly in response to admission of pressure fluid from line 673 effects movement of the fluid in cylinder 203 outwardly via a hydraulic line 674. The flow of exhaust fluid from line 674 continues through the leftwardly moved valve spool 677 of valve 668 and thence through a preset control valve 678 to the main exhaust lines 538.

Counterclockwise rotation of the tool change member 172 from the 0° position shown in FIG. 18B to the 180° position illustrated in FIG. 18D, is effected by deenergizing solenoid 670, FIG. 17, and energizing a solenoid 679. With the spring 672 of valve 667 urging the valve spool 671 leftwardly, the cylinder 204 is connected via line 673 and the control valve 680 to the exhaust line 538. At the same time, energization of solenoid 679 effects rightward movement of valve spool 677 in opposition to a spring 681. Thereupon pressure fluid from supply line 536 flows through a conductor 682, and thence through a cannelure in rightwardly moved valve spool 677 to the line 674. As this occurs, pressure fluid from line 674 flows into the cylinder 203 effecting movement of piston 207 in a manner to rotate the tubular shaft 186 and tool change member 172 in a counterclockwise direction to the position shown in FIG. 18D. Upon arrival of the tool change member 172 at the 180° interchanged position represented in FIG. 18D, the dog 664, FIG. 17, is moved into engagement with switch 663.

The control circuit for effecting rotational movement of the tool storage magazine 62 for advancing a particular preselected tool into the tool change ready station, as shown in FIGS. 1 and 2, is schematically represented in FIG. 19. As there shown, the various horizontal control conductors designated according to the key as 1 to 19, inclusive, are operatively interconnected between energized control conductors 687 and 688. The energized control conductors 687 and 688 are connected to be energized by a source of power by actuating switching means [not shown] in well-known manner. As hereinbefore explained with reference to FIG. 2, the switch actuating leaves 130 carried by the retractable switch mechanism 131 are operated in code fashion by the coded collar 126 associated with each of the toolholders. The arrangement for providing a coded input signal together with the coded actuation of switch leaves 130 by the appropriate coded collar 126 is fully explained in the aforementioned patent application to Brainard et al. Thus, it is not deemed necessary to explain fully the coincidence circuit required for actually stopping movement of the indexable tool storage magazine 62 in the present application. It is deemed sufficient to state that a binary coded number is impressed on the control system to indicate the next required tool to be advanced into the tool change ready station. The next selected tool is provided with a coded collar 126 having alternate grooves and rings disposed to provide a binary signal. Thus, during rotational movement of the magazine to preselect the tool, the coded collar associated with that tool so actuates the switch leaves 130 as to impress a binary coded signal upon the control system that is coincident with the tape input signal. Upon establishment of coincidence of the binary coded signal caused by actuating the switch leaves with the binary coded signal from the tape, rotation of the magazine stops.

At the start of any tool selecting movement of the magazine 62, it will be apparent that the coded switch actuating mechanism 131 represented in FIG. 2 is in outward operating position in a manner that the actuating switch leaves 130 impinge upon the circular path of travel of the coded collar 126. Further, as hereinbefore explained, it will be recalled that tool selecting movement of the storage magazine 62 is initiated during some other machine function, such as an actual machining operation.

Referring now to FIG. 19, a normally open contact 689 in line 1 is closed to initiate rotatable movement of the storage magazine. Likewise, a normally open contact 690, line 17 in FIG. 19, is subsequently closed upon movement of the preselected tool into the tool change ready station, thereby completing the tool code coincidence circuit to stop rotation. In other words, a coded input signal from the control tape effects closure of the normally open contact 689, line 1 in FIG. 19, to initiate rotatable movement of the tool storage magazine. Upon arrival of the preselected tool in the tool change ready station, a coincidence circuit initiated by the coaction of switch leaves 130, FIG. 2, with an appropriate coded collar 126 of the preselected tool effects closure of the normally open contact 690, line 17 in FIG. 19, energizing a relay 702.

Prior to closure of contact 690, the index drum is latched in position and the limit switch 112 in line 10 is in its normally open position as shown in FIG. 19. Whenever switch 112 is open, the latch 105, FIGS. 2 and 17, is engaged with the ring gear 103. At the same time, with the drum latched against rotation, the normally closed limit switch 158 is actuated to open position as shown in line 14 of FIG. 19. Conversely, during rotational indexing movement of the drum, normally open switch 112 is actuated to closed position, and switch 128 returns to its normally closed position. Thus, the two limit switches function to effect sequencing of the automatic tool selection indexing cycle.

Initially, closure of normally open contact 689 in response to a tape signal completes a circuit from energized conductor 687 along horizontal line 1, and thence through a normally closed contact 692-1 to energize a relay coil 693, the circuit being completed to energized conductor 688. Upon energization of coil 693, an associated normally open contact 693–6 is moved to closed position to effect energization of relay 695.

With relay 695 energized, a normally closed contact 695–7 is opened to deenergize solenoid 574 and a normally open contact 695–8 is closed upon energization of coil 695 to complete a circuit from conductor 687 to energize the solenoid 573 which operates the valve 569, FIG. 17, to move latching lever 105 to fully retracted disengaged position. However, there is represented on line 13, FIG. 19, a relay coil 704 adapted to initiate counterclockwise rotation of the tool storage magazine for bringing the tool to the exact selected position, as previously mentioned.

As soon as the latching lever 105 is disengaged, the contact bar of switch 112 is moved to closed position completing a circuit from energized conductor 687 along line 11 through the now closed contact bar 693–10 of energized relay 693, a normally closed contact 702–9, a normally closed contact 704–9 to energize a relay coil 703 that is connected to initiate clockwise rotation of the tool storage magazine. The circuits to the relay coils are interlocked to preclude energization of both these coils simultaneously. Thus, upon energization of the coil 703 as hereinbefore described, a normally closed contact 703–10 associated therewith is moved to open position to preclude energization of the coil 704. Upon movement of the coil 703 to energized closed position, another circuit is completed along lines 16 and 15 via the normally closed contact 709–13 and the closed contact 703–13 to energize solenoid 545, FIGS. 19 and 17. Upon energization of the solenoid 545, the tool storage magazine 62 is rotated in a clockwise direction until the next selected tool, as determined by the binary coded signal from the control tape, is moved into the tool change ready station. Prior to starting rotation of the magazine 62, the roller detent 560, FIG. 17, is retracted thus effecting movement of switch 158 in line 14 of FIG. 19 to its normally closed position. Closure of switch 158 effects energization of relay 708 causing closure of normally open contact 708–2 to complete a circuit for energizing relay 692. Energization of the relay coil 692 effects movement of contact 692–1 to open position and effects deenergization of relay 693. However, the relay coil 695 is retained energized either through horizontal line 6, via now closed contact 692–5 and the normally closed contact 702–5 of deenergized relay 702, or through horizontal line 8 and now closed contact 708–7.

As soon as the selected tool reaches the tool change ready station, the tool coincidence circuit [not shown] operates to effect closure of the normally open contact 690 in line 17 to complete a circuit from energized conductor 687 to energize the relay coil 702. Upon energization of the relay coil 702, contacts 702–9 and 702–10 are moved to their open and closed positions respectively. Consequently, the circuit to the clockwise rotation relay 703 is interrupted to deenergize this relay, and open an associated contact 703–13 to deenergize the clockwise rotation solenoid 545. The arrangement is such that solenoid 545 is deenergized to stop rotation of the tool storage magazine slightly before the latching lever is returned into latching engagement with the driving ring gear. After rotation of the magazine stops immediately upon initiation of reversed rotation and prior to engagement of the latching lever 105, the cam lever 557 is actuated to effect intermediate final positioning of the magazine. Movement of the lever 557 to reengage the cam roller 560 with the cam plate 561, as shown in FIGS. 17 and 19, actuates normally closed switch 158 to open position thereby effecting deenergization of the relay coil 708. Energization of the relay coil 702 likewise effects movement of contact 702–5 to open position thus deenergizing the relay coil 695. Thereupon, associated contacts 695–7 and 695–8 are respectively moved to normally closed and normally open position. With this condition existing, the latching retracting solenoid 573 is deenergized and the lock engaging solenoid 574 in line 8 is energized to effect return movement of the latching member into engagement with the ring gear and simultaneous disengagement of the tool storage clamp associated with the preselected tool.

Upon movement of the latching lever 105, FIG. 17, to latched position upon energization of solenoid 574, switch 112 is deactuated, thereby effecting movement of associated contact in line 10 to normally open position to preclude reenergization of the control relays 703 and 704. Deenergization of the coil 708 closes a normally closed associated contact 708–15 to complete a temporary seal-in circuit for retaining relay 702 energized momentarily after the preselected tool has been moved into the tool change ready station. This circuit had been completed from energized conductor 687 via the originally closed contact 708–15 and a closed contact 702–15 to energize the relay 702. Thus, after the coincidence contact 690 returns to its normally open position and relay 708 is maintained energized, relay 702 is deenergized to preclude reenergization of the relay 695, line 6.

It will now be assumed that the proper preselected tool has been moved into the tool change ready station and the spindle head 37 moved along the X and Y axes to the spaced apart tool change station relative to the tool change mechanism 60, as shown in FIGS. 1 and 3. During return movement of the spindle head 37 to the ready station, as hereinbefore explained, the tool spindle 40 has been rotatably positioned to align the keyway for receiving the preselected tool. In other words, conditions have been established for actuating the tool change mechanism 60 in FIG. 1 for interchanging the drill 61 carried by the storage magazine 62 with the milling cutter 43 carried by the tool spindle 40. With these conditions having been established, the tool change is effected in response to a single input signal from the control tape or storage medium. As shown in FIG. 20, operation of the tool change is initiated by closure of a normally open contact 701, line 23, in response to the tape signal. Upon closure of contact 701, a circuit is then completed along horizontal conductor 23 via vertical conductor 705 and thence along line 26 through normally closed contacts 720–19 and 711–19 to energize a relay coil 712, the circuit being completed to energized conductor 688. Energization of coil 712 immediately effects closure of a normally open contact 712–20 to complete a seal-in circuit around contact 711–19 as it is moved to open position. At the same time, energization of relay 712 effects closure of another normally open contact 712-17, completing a circuit along line 23 to energize a relay coil 711, closure of which effects closure of normally open seal-in contact 711-18. Energization of coil 711 effects movement of the normally closed contact 711-19 to open position; this has no effect on continued energization of relay coil 712 which is sealed in via the now closed contact 712-20.

At this moment, as is represented in FIGS. 1 and 3, the tool grips 181 and 182 are both retained in retracted position within the hollow housing 174 of the tool change member 172. With this condition existing, as shown in FIG. 9, the cam plate 253 carried for movement with the tool grip actuating shaft 239 is positioned to retain a normally closed contact of limit switch 254 in its open position. Thus, the contact bar of switch 254 is represented in line 29 of FIG. 20 as being in open position, during complete retraction of the tool grips 181 and 182. Upon energization of the relay coils 711 and 712 in lines 25 and 26 in response to the tape signal, the associated normally open contacts 711-21 and 712-21 are closed to complete a circuit on line 28 to effect energization of a relay coil 709, the opposite terminal of which is connected to the energized conductor 688. Energization of coil 709 effects movement of an associated normally closed contact 709-13, FIG. 19, to preclude energization of solenoids 545 or 563 during a tool changing cycle. Inasmuch as solenoids 545 and 563 are operative to effect movement of the tool storage magazine, this arrangement prevents rotating the magazine during a tool change.

Upon energization of relay 709, associated contacts 709-23 and 709-24 are respectively moved to open and closed position. Consequently, the solenoid 585, line 30, is deenergized and the solenoid 593, line 31, is energized to effect retracting movement of the code actuated switching mechanism or reader head 131, FIG. 3. With the switch mechanism 131 pivotally retracted to its dotted line position, the switch leaves 130 carried thereby are retracted from engagement with the coded rings carried by the tool collar to permit subsequent axial withdrawal of the toolholder carrying the drill 61.

Upon movement of the switch mechanism or reading head 131 to fully retracted position, FIG. 17, a switch 159, in line 32, is moved from normally open to closed position. As shown in FIG. 20, a circuit is then completed along horizontal conductor 33 via a normally closed contact 715-26 and along line 32 to energize a relay coil 716. Whenever the collet 422, FIGS. 13 and 20, is in clamped engagement with a toolholder, the contact bar of switch 451 is open. Upon energization of coil 716, the tool grips 181 and 182 are moved from retracted to extended clamped position. Actually, upon energization of coil 716, an associated contact 716-27 is moved to open position to deenergize the solenoid 619. Solenoid 619 had initially been energized upon energization of coil 709, line 28, thereby effecting closure of contact 709-27 which completed the circuit along line 34 to energize the solenoid 619. At this time, closure of another contact 716-44 completes a circuit along line 57, vertical conductor 731 to energize the solenoid 630 which is operative to hydraulically advance the tool grips 181 and 182 from retracted to extended clamped position as hereinbefore described.

Whenever the carriage 169 and tool change member 172 are retained in the inward position, the dog 234 engages a switch 235, shown in FIG. 20. At this time, therefore, the associated switch contact 235-27 is actuated to closed position bridging a circuit along line 34, and the normally open contact 235-28 is actuated to open position interrupting a circuit along line 35. Upon movement of the tool grips 181 and 182 from retracted to extended clamped position, the cam plate 253 shown in FIG. 9 is moved from engagement with switch 254 into a position actuating switch 258. As this occurs, the contact bar shown in line 56, FIG. 20, of switch 254 moves from closed actuated position to its normally open position thus interrupting a circuit along conductor 56. At the same time, actuation of switch 258 effects closure of its contact, shown in line 35 from normally open position to closed position thereby completing a circuit from energized conductor 687 along conductor 35, a vertical conductor 733, a normally closed contact 715-29, a vertical conductor 734, and thence via the now closed contact of switch 258 to energize a relay coil 717.

Energization of the coil 717, line 35, effects actuating movement of associated contacts 717-44 and 717-45, the contact bar 717-45 now being moved to an open position to interrupt completion of a circuit along horizontal line 58. This contact 717-45 is disposed upon subsequent deenergization of coil 717 to delay slightly and then move to closed position as now shown in FIG. 20. At the same time, with contact 717-45 now in open position, the contact 717-44 after a slight delay is actuated to closed position upon energization of coil 717, thereby completing a circuit along line 57. Inasmuch as relay coil 716 is energized, a circuit is then completed from energized conductor 687 via the now closed contacts 716-44 and 717-44 to energize a coil 726 of a latching relay 727. Upon energization of coil 726, associated contacts 726-32 and 726-33 are respectively moved to closed and open position. With contact 726-33 now open, the solenoid 527 is deenergized to permit movement of the collet clamp piston 447, FIG. 13, to unclamped position. At the same time, closure of contact 726-32 completes a circuit from energized conductor 687 along line 43, vertical conductor 736, the now closed contact 726-32 for energizing the collet unclamping solenoid 523.

As soon as the solenoid 523 is operated to unclamp the tool in the spindle, the contact 451-15 of switch 451 in line 38 is moved to closed position to effect energization of a relay coil 720, the latter being operative to effect bodily movement of the tool carriage 169 and tool change member 172 to forward position for retracting the tools respectively carried by the storage magazine and tool spindle. It should be noted that a plurality of overlapping circuits are provided along lines 37 to 41 inclusive, for retaining relay coil 720 energized during the required portion of the tool change cycle.

At the moment the collet unclamping solenoid 523, line 42 is energized, it will be recalled that the tool change member 172 is in the 0° position to actuate a switch 662 to closed position as represented in line 51. Thus, the circuit is retained through the closed contact bar 662 to energize relay coil 723. Consequently, associated contact 723-32 in line 42 is now in open position, and also normally closed contact 723–42 in line 54 is opened. Thus, a coil 715 in line 54, is retained in deenergized condition, coil 715 representing the latch engaging coil of a latching relay 714. Inasmuch as coil 715, line 54, is deenergized, associated contact 715-30 in line 37 is retained in normally closed position completing a circuit from energized conductor 687 via vertical conductor 738, and thence through the now closed contact 451-15 to energize the coil 720 in line 38. The initial circuit for energizing coil 720 is completed via normally closed contact 715-30 since no circuit is possible at this time via the normally open contact 722–40 nor the contact 723–32 which is opened due to energization of relay coil 723 in line 51.

Initially, upon energization of coil 720, an associated normally closed contact 720–35 is opened to deenergize the solenoid 644 which operates to retain the tool carriage in its inner position. At the same time, another contact 720–46 is closed, completing a circuit from the energized vertical conductor 731 via the now closed contact to energize solenoid 652 for effecting outward movement of the carriage 169 and tool change member 172. With the carriage moved to its forward outer position, the limit switch 662 in line 51 is retained closed until the tool change member pivots to its 180° position. As soon as the carriage 169 is moved forwardly a sufficient distance to permit pivotable movement of the tool change member 172, FIG. 7, the cam 234 carried by the carriage actuates switch 236. At this time, a contact bar 236 associated with the switch is moved to closed position to complete a circuit along line 46 in FIG. 20 from energized conductor 687 to a vertical conductor 739.

Inasmuch as the tool change member 172 is still in its 0° position, switch 662 in line 51 remains closed to retain relay coil 723 energized, with the consequent retention of coil 715 deenergized. Therefore, an associated contact 723–36 is in closed position to complete a circuit from conductor 687 along line 46 via normally closed contact 715–36 and thence through the now closed contact 723–36 to energize a coil 72 of a latching relay 721. Inasmuch as the relay 721 is of the latching type, it will remain in actuated position as effected by energization of coil 722 even though the circuit thereto along line 46 is subsequently interrupted. In other words, deactuation of latching relay 721 is not effected until an associated coil 724, line 48, is energized. Upon energization of coil 722, associated contacts 722–38 and 722–39 are respectively actuated to closed and open position. Thus, upon movement of normally closed contact 722–39 to open position upon energization of coil 722, a circuit from energized conductor 739 is interrupted to the solenoid 670. Solenoid 670, as represented in FIG. 17, is operative to retain the tool change member 172 in its 0° position. At the same time, movement of normally open contact 722–38 to closed position completes a circuit from the now energized vertical conductor 739 along line 49 to effect energization of the solenoid 679 which is operative to effect pivotable movement of the tool change member 172 to its 180° position. Upon arrival of the tool change member 172 at the 180° position, the entire tool change member 172 and guiding carriage 169 is again moved in a rearward position to insert the interchanged tools into the storage matrix and the tool spindle.

As the pivotable movement of the tool change member 172 from 0° position is initiated, limit switch 662 in line 51 is moved to its normally open position to effect deenergization of relay coil 723. Upon deenergization of the coil 723, associated contact 723–36 in line 46 is moved to normally open position. Movement of contact 723–36 to open position has no effect upon the actuated condition of latching relay 721. At the same time, upon deenergization of relay coil 723, contact 723–42 is returned to its normally closed position completing a circuit along line 54 from energized conductor 687 and extending via normally closed contact 725–42 to effect energization of the coil 715 of latching relay 714.

Upon arrival of the tool change member 172 at its 180° position to interchange the position of the tools, the cam 664 associated therewith is moved into actuating engagement with limit switch 663, as represented in FIG. 17. As this occurs, the switch 663 in line 52, FIG. 20, is moved to closed position completing a circuit along the line 52 to energize a relay coil 725. Energization of coil 725 effects movement of normally closed contact 725–42 with no effect on the actuated condition of latching relay 714, which remains actuated due to prior energization of relay coil 715.

Immediately prior to the energization of relay coil 725 in line 52 in response to closure of switch 663, the seal-in circuit to retain relay 720 in energized condition extended through the normally closed contact 725–32. Immediately prior to energization of coil 725, relay coils 715 and 722 were energized and coil 723 was deenergized. Thus, at the moment of energizing coil 725, the holding circuit for coil 720 in line 38 extended along lines 38 to 41 inclusive to a vertical conductor 740. The circuit along line 37 to vertical conductor 738 is interrupted at this time due to movement of normally closed contact 715–30 to open position. Likewise, the circuit along line 39 from conductor 740 to conductor 738 is interrupted due to movement of the normally closed contact 722–31 to open position. Thus, the holding circuit for coil 720 is now completed along line 41 via normally closed contact 723–32, and normally closed contact 725–32 to conductor 738 and thence via the collet unclamp switch 451-15 moved to closed position to maintain coil 720 energized.

At this moment, therefore, energization of coil 725 effects movement of the associated normally closed contact 725–32 to open position, interrupting the circuit to vertical conductor 738 and effecting deenergization of the relay coil 720. Deenergization of coil 720 effects movement of the associated contact 720–46 to normally open position thus interrupting a circuit from energized vertical conductor 731 along lines 58 and 60 to deenergize solenoid 652. With solenoid 652 deenergized, a circuit is conditioned for effecting inward movement of the carriage 169. At the same time, contact 720–35 is closed to complete a circuit along line 44 to energize solenoid 644. Upon energization of solenoid 644, the tool change member 172 and carriage 169 are moved in a rearward direction to bring the guiding abutments presented by the pivotable tool change member 172 into guiding engagement with the undersides of the guideways.

This circuit for energizing solenoid 644 is completed along line 44 via the normally closed contact 720–35, and thence via the closed contact 717–35 of energized coil 717 in line 35 to a vertical conductor 741. From conductor 741, the energized circuit continues along line 45 through the closed contact 725–35 of energized coil 725 and thence to line 44 to effect energization of the solenoid 644. Referring to coil 717, it will be recalled that the circuit for retaining this relay energized has been completed along line 35, via vertical conductor 733, normally closed contact 715–29, and vertical conductor 734; and thence continues along line 35 and through the closed switch 258, indicating the tool grips are in outward extended position, to energize coil 717. With the carriage in outward position, however, this circuit is completed directly along line 35 via the now closed contact 235–28.

Upon energization of solenoid 644 in line 44, the hydraulic circuit is activated to effect return movement of the carriage 169, FIG. 17. Upon arrival of the carriage in its innermost position, the interchanged tools are reinserted in the storage magazine and the tool spindle, respectively. As soon as this occurs, inward movement of the carriage 169 effects movement of the dog 234 into engagement with switch 235, FIG. 17. Thus, the associated normally closed contact 235–28 is moved to open position and normally open contact 235–27 is moved to closed position. Actually, upon movement of contact 235–28 to open position, a circuit is interrupted along lines 35 and 36 to effect deenergization of coils 717 and 718. Consequently, a contact 717–45 is moved to closed position to complete a circuit along line 58 to energize an unlatching coil 743 of the relay 727 to effect return movement of relay 727 from actuated position. As this occurs, an associated contact 726–32 is returned to normally open position effecting deenergization of the collet unclamping solenoid 523; and, a contact 726–33 is returned to normally closed position effecting energization of collet clamping solenoid 527. Thereupon, as hereinbefore explained with reference to FIG. 13, the stack of disk springs 428 are operative to effect reclamping of the collet 422.

Upon return movement of the switch contact 235–27 to actuated closed position, a circuit is again completed along line 34 to effect reenergization of the solenoid 619 for effecting return movement of the tool grips 181 and 182 to fully retracted position. Movement of the tool grips to retracted position effects corresponding movement of the cam 253, FIG. 9, into engagement with switch 254. As this occurs, the contact of switch 254, line 56, in FIG. 20, is returned to closed position, completing a circuit along line 56 via the normally closed contact 709–43 of deenergized relay 709 to effect energization of an unlatching coil 744 that is operative to effect deactuation of the latching relay 714. Prior to energization of unlatching coil 744, the closed contact 254 in line 29 is moved to open position. Since, the coil 712 had been previously deenergized its associated contact 712–21, in line 28, is now open. Therefore, when the contact of switch 254, in line 29, is moved to open position upon retraction of the tool grips, the coil 709 will be deenergized and its associated contact 709–43, in line 56, is returned to its normally closed position. Thus, at this time, the circuit is interrupted along line 28 to deenergize coil 709 with subsequent return movement of contact 709–43 to closed position effecting energization of unlatching coil 744. Upon deenergization of coil 709, the interchange of tools has been completed and the collet clamp has been returned into engaged position to secure the preselected tool for the next machining operation.

During an automatic tool change cycle in response to a tape controlled signal, the contact 701 in line 23 is retained in its closed position until the complete interchange of tools has been effected. When the interchange of tools has been effected the tape controlled contact 701, in line 23, will be returned to its normally open position. As this occurs, coil 711, in line 25, will be deenergized and the control circuit is conditioned for a subsequent tool change operation.

It will be apparent that the tool interchange can be effected by a manually initiated means as well as automatically in response to tape control. To accomplish this, a push button control 746 is depressed to establish an energized circuit from energized conductor 687 via the push button switch contact 746 to the vertical conductor 705 and thence along line 26, as hereinbefore described.

To effect bodily movement of the major movable members along the X, Y and Z axes, there is provided a tape control system schematically shown in FIG. 21. As there shown, closure of a switch 749 connects energized conductors 687 and 688 to energize conductors 750 and 751 respectively. Energized conductors 750 and 751 are directly connected to energize a tape reader 752, which is operative in well-known manner to transmit output signals from a coded punched tape [not shown] to an output conductor 754. The tape reader 752 is adapted to transmit digital information from moving tape [not shown] of the well-known punched tape to effect movement of the major movable members, as well as supplying, where required, the signals for effecting indexable movement of the tool storage magazine to preselect the next tool, and provide a signal for initiating a tool change cycle. As well known in the art, the tape reader is provided with a plurality of switches operative in binary code form by means of switch plungers engaging appropriately spaced holes in the punched tape, as the tape is mechanically advanced relative to the reader. From the tape reader 752, the conductor 754 is operable to activate a code converter 755 disposed, in turn, to convert information from the tape code to decimal code; store this information in registers in the form of sine-cosine voltage ratios for predetermined selected point to point positioning; and, linear voltage ratios for velocity control. In addition to converting and storing information for the X, Y and Z axes, the code converter 755 is also operative to store information in binary code form relative to the required speed of the tool spindle; the selected indexed position of the rotatable tool storage magazine for preselecting a tool; and, for initiating a tool change cycle.

From the code converter 755, machine operating input signals are transmitted to a common trunk line 756 containing a plurality of branch conductors connected to different error operators.

To simplify the description, the four branch conductors and their error operators have been respectively designated by common numerals 759 and 760, each being followed by an appropriate letter suffix to indicate the particular movement being controlled. Conductor 759X, for example, transmits information from the trunk line 756 to activate the error operator 760X for supplying both positional and velocity control information for moving the column 28 along the X axis. The error operator 760X is operative to receive feed back information via lines 762X and 763X, the latter being respectively connected to supply feed back information as to the position of the column 28 along the X axis and information as to the velocity of the column 28 as it is being moved along the X axis. To provide accurate position feed back information, the line 762X is connected to a position indicator or reading head 765X which is secured directly to the column 28. The reading head 765X is carried for movement relative to a cooperating scale 766X which is secured directly to the supporting frame and connected to be energized by means of supply conductors [not shown]. The cooperative coaction between the reading head 765X and the scale 766X provides an accurate feedback signal to indicate the position of the column along the frame as it is moved to a selected position along the X axis. The cooperating reading head 765X and energizeable scale 766X are schematically representative of well-known, commercially available units that are operative in the manner described to supply position feedback information.

In a similar manner, to provide feedback information as to the velocity of the column 28 as it is moved along the frame, the line 763X is connected to receive information from the tachometer 767X which is mechanically connected to be driven by movement of the column 28. The error operator 760X operates to produce voltage proportional to the magnitude of the error, as well as indicating the direction of position error. The voltage ratios and binary numbers stored in the code converter 755, irrespective of whether they are operative to obtain positional or velocity input signals, are compared to the corresponding voltage ratios and binary numbers from the feedback conductors connected to the error operator 760X, with motion being stopped upon the occurrence of coincidence between the feedback supply and the code converter information.

From the error operator 760X, command control information is transmitted to actuate a servo amplifier 770X which is directly connected to accurately control the velocity and extent of movement of a reversible power actuator 771X. The power actuator 771X may comprise an electric motor, or a valve controlled hydraulically actuated servo-motor 772X which is directly connected to drive the column moving translating screw 773X. The translating screw 773X in turn is connected to be engaged by a nut 775X directly secured to the movable column member 28. The general arrangement for effecting movement of the column 28 along the X axis is similar to that utilized for effecting the required movement of the work supporting saddle 48 along the Z axis, spindle head 37 along the Y axis, as well as rotational speed of the tool spindle 40.

As schematically represented in block diagram form, FIG. 21, the power actuator 771X is connected to drive a translating mechanism 780X which, in turn, is directly connected to a load 781X, in this case represented by the column 28. Actually, the translating mechanism 780X is represented as comprising a cooperating screw 773X and nut 775X, although any suitable equivalents may be utilized for these particular elements.

Each of the error operators designated by the common number 760, is connected to a branch conductor 782, the branch conductors designated by the common numeral 782 being in turn connected to a trunk line 783 respectively connected to the tape reader 752. Thus, whenever a particular series of programmed movements of the major members is completed, the error operators 760 are connected via the trunk line 783 to provide a signal to the tape reader 752 which is then operative to supply the subsequently utilizable control information. The signal from the trunk line 783 provides a signal to the tape reader for proceeding with the next block of information on a tape connected to effect machine movements. In a similar manner, the servo amplifiers designated by the common numeral 770 are connected via branch conductors 785 to a common energized line 786.

As hereinbefore explained, the various elements designated by common numerals in the block diagram, FIG. 21, are operative in similar manner to perform identical functions, although the placement of various of these elements is completely different in the associated machine structure, depending upon the particular structural component it is associated with. Although not shown in FIG. 21, a similar power drive responsive to tape reader 752 is connected to effect selective indexable movement of the work supporting table 49. It is to be noted that the tape input from the tape reader 752 is operative to effect both velocity and point to point positioning control of the major members, including the column 28, spindle head 37, and work supporting saddle 48 along the X, Y and Z axes.

In addition to the command information available to these major movable members, separate fixed reference signals are available to effect the required movement of the column 28 and spindle head 37 for positioning the tool spindle 40 in the tool change station. Normally, the tool spindle 40 is provided only with a velocity control as indicated in FIG. 21, inasmuch as the tool spindle 40 is rotated at a selected rate for performing a machining operation. In addition to the velocity control, the tool spindle 40, in this case, is likewise provided with a fixed supply of reference command voltage for moving the tool spindle 40 into the required angular position as a prerequisite to initiating a tool changing cycle.

Bodily positioning movement of the tool spindle 40, as well as angular positioning thereof, is effected in response to an appropriate signal from the tape reader 752, this signal being appropriately spaced upon the punched control tape in relation to the other command information for initiating the various other machine movements or functions.

For positioning the tool storage magazine 62, FIG. 21, a signal from the tape reader 752 is transmitted to the code converter and thence via trunk line 756 and a conductor 788 to a switch coincidence control circuit 789. From the coincidence circuit 789, the circuit continues via a conductor 790 to actuate the hydraulic control valve 540 for activating the magazine drive motor 118 which is connected via ring gear 103 to rotate the tool storage magazine 62, as hereinbefore explained. Upon arrival of the next selected tool at the tool change ready station, the coded collar 126 is operative to actuate the coded switching mechanism 131, the latter being connected via a return conductor 791 to the switch coincidence circuit 789. Upon the occurrence of coincidence between the coded input signal from the tape reader 752 and the switch mechanism 131, the coincidence switch actuating circuit 789 is operative to actuate the control valve 540 for stopping motor rotation.

Normally, the rate of the rotation of the tool spindle 40 is under control of the tape reader, via the error operator 760S and servo amplifier 770S, the latter being operative to drive the transmission 792 connected via gears 389 and 390 to rotate tool spindle 40. As hereinbefore explained, the variable speed transmission 792 is selectively operative to provide different ranges of spindle rotation by selective energization of one or another of magnetic clutches 369, 379 or 385 shown in FIG. 13. For regulating spindle speed, the spindle 40 is directly connected to drive a tachometer 767S which, in turn, is connected to the error operator 760S.

Whenever the tape reader 752 calls for a tool change, it is necessary as a prerequisite thereto to effect the required bodily and angular positioning of the tool spindle 40 as hereinbefore explained. To this end, an alternative positioning control is operative to effect rotation of the tool spindle 40 to the required angular position. The drive for effecting the required positioning movement of the tool spindle prior to initiating a tool change cycle is effected by closure of a contact 794 in response to an appropriate signal from the tape reader, FIG. 21. Upon closure of the contact 794, FIG. 20, a circuit is then completed from energized conductor 687 along line 63 to energize a relay coil 795. The relay coil 795 is energized to effect movement of a normally closed contact 795-46 to open position to interrupt a control circuit to a control 796 for the speed transmission. At the same time, upon energization of coil 795, a normally open contact 795-47 is closed to complete the circuit along line 62 to energize a solenoid 369S for operatively effecting engagement of the corresponding slow speed spindle clutch 369, FIG. 13. Irrespective of the previous speed of the tool spindle 40, closure of contact 794 in FIG. 20 effects immediate energization of the slow speed clutch 369, with the tool spindle 40 then being connected for rotation at the slowest speed, and the positioning synchro 353 likewise being connected for slow speed rotation.

Energization of the relay coil 795 effects actuation of the associated normally closed and normally open contacts represented in FIG. 21. As there indicated, normally closed contacts 795D are moved to open position to interrupt the control from the error operator 760S. At the same time, normally open contacts 795F are moved to closed position to interconnect conductors from a fixed command reference voltage 797 to the positioning synchro 353. The synchro 353 is operatively connected to a disciminator panel 798 which is now connected via the normally open now closed contacts 795D of energized relay 795 to control the operation of servo amplifier 770S. With this condition existing, the spindle drive motor 354 continues to rotate the tool spindle 40 at a slow speed until it arrives at the appropriate angular position required by the fixed command reference voltage 797. At that moment, the keyway presented by the tool spindle is properly aligned with the corresponding keyway in the tool storage magazine.

In a similar manner, the tool spindle 40 is bodily positioned along the X and Y axes by the appropriate required operation of motor 772X and 772Y. As represented in FIG. 21, fixed reference command voltages are connected to effect the required positioning movement of the column 28 and the spindle head 37 for moving the tool spindle 40 bodily to the required tool change ready station. To simplify the description, reference numerals corresponding to these used for effecting angular positioning movement of the tool spindle 40 are represented with the appropriate letter suffixes as effecting the required bodily positioning movement of the upright column 28 and spindle head 37. After these movements have been completed, as hereinbefore explained, the tool change cycle may be initiated by tape controlled actuation of the contact 701 in FIG. 20 in response to a tape command signal.

As schematically represented in FIG. 21, the lineal potentiometer 494 is operatively interconnected in the feedback conductor 763Z. Thus, during a tapping operation, the control rod 493 for the potentiometer is axially movable to effect a continuous modulating effect on the rate of Z axis movement.

From the foregoing detailed explanation of the operation of the tool changing mechanism and machine tool herein set forth as a practical embodiment of the present invention, it will appear that there has been provided a greatly improved automatic machine in combination with an improved tool changing mechanism that is automatically operative to interchange preselected tools with the tool spindle.

Although the illustrative embodiments of the invention have been described in considerable detail for the purpose of fully disclosing a practical operative structure by means of which the invention may be practiced, it is to be understood that the particular apparatus and control system herein described are intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a tool change mechanism for a machine tool; a storage socket carried in an operating tool change ready station;
   a power driven rotatable tool spindle movable to a predetermined spaced position relative to said storage socket;
   a tool changer comprising a horizontally disposed support presenting guideways;
   a support carriage guided by said support for longitudinal movement along an axis parallel to said socket;
   a tool change mechanism pivotally carried by said carriage and provided with spaced apart guide shoes slidably engaging said support;

a pair of extensible gripper devices carried within said mechanism for extensible movement in opposite directions therefrom;

a first power drive connected to activate said gripper devices into simultaneous clamped engagement with tools respectively carried by said storage socket and said tool spindle;

a second power drive connected to effect longitudinal movement of said carriage and said mechanism for simultaneously retracting said tools from said storage socket and said tool spindle;

a third power drive connected to pivotably rotate said mechanism 180° for interchanging the aligned positions of said tools with said storage socket and said tool spindle;

means for reversing the operation of said second power drive for inserting said tools in interchanged positions into said storage socket and said tool spindle respectively;

and means for actuating said gripper devices to released positions.

2. In a machine tool;

a power driven tool spindle provided with a releasable spring collet and a keyway for engaging a tool for a positive drive thereto;

a tool storage matrix provided with a plurality of tool receiving sockets respectively provided with internal keyways disposed in identical angular relationship, said keyways presented by said storage sockets being identical in size to the keyway in said spindle;

means for effecting relative movement between said tool storage matrix and said tool spindle for moving a preselected one of said tools to a tool change station in predetermined spaced relationship to said tool spindle;

means for rotatably moving said tool spindle to an angular position in which the keyway provided therein is in predetermined angular relationship to the keyway in the storage socket at the tool change ready station;

and a tool transfer mechanism operatively connected to effect an interchange of the tools respectively carried by the storage socket in said ready station and said tool spindle.

3. In a machine tool;

a tool storage socket presenting an internal keyway;

a rotatable power driven tool spindle having a releasable tool clamp and a keyway corresponding in size and configuration to the key carried by said storage socket;

a tool having a shank provided with a key complementary to the keyways presented by said storage socket and said tool spindle;

power drive means connected to rotate said tool spindle to a predetermined angular position in which the keyway presented thereby is in a predetermined angular position relative to the keyway carried by said stationary storage socket;

a tool change arm including tool securing means operatively connected to withdraw a tool from said storage socket and replace the tool in said tool spindle in such a position that the key carried by said tool engages the keyway in said tool spindle ;

and means for actuating said spindle clamp for fixedly securing a tool therein whereby said tool is positively engaged in said spindle during subsequent operation of said spindle to perform a machining operation.

4. In a machine tool having a tool change station;

a tool change mechanism provided with extensible tool gripping means carried for bodily movement in the tool change station;

a tool storage matrix adapted to carry a plurality of cutting tools;

power operable means connected to move said storage matrix for moving a preselected tool into said tool change station;

positive drive means affixed to the preselected tool stored in said change station;

a power driven rotatable tool spindle provided with complementary positive driving means and being carried for bodily movement relative to the tool change station;

power driven means connected to effect bodily movement of said tool spindle into proximity to the tool change station and into predetermined spaced relationship to the preselected tool;

means for rotating said tool spindle to a predetermined angular position to facilitate insertion of a preselected tool carrying the positive driving means;

a releasable clamp mechanism carried by the tool receiving end of said tool spindle;

a control mechanism including power driving means connected to actuate said gripping means for extensible movement into clamping engagement with the preselected tool carried by said matrix, said control means being operative after the tool is clamped to effect bodily movement of said tool change mechanism for withdrawing the preselected tool carried thereby from said storage matrix to effect bodily movement of the preselected tool into a position of axial alignment with said tool spindle, and to effect bodily insertion of the preselected tool into the tool receiving end of said spindle, said control mechanism being then operative to release said gripping means to inactive position;

and means for actuating said clamp mechanism for securing the preselected tool in said spindle in a manner that the positive driving means respectively carried by said tool and said spindle are in positive intermeshing engagement.

5. In a tool change mechanism for a machine tool;

a horizontal guideway;

a carriage slidably carried for rectilinear movement along said guideway;

a tool changer pivotally secured to said carriage provided with means slidably engaging said guideway for retaining it in predetermined alignment with said carriage;

a pair of extensible tool changing clamps carried by said changer for selective laterally extensible movement from retracted positions;

power drive means connected to move said carriage in one direction until said changer is disengaged from said guideway;

means connected to effect pivotal movement of said changer relative to said carriage;

means connected to reverse said power drive means for moving said carriage in the opposite direction to urge said changer into guiding engagement with said guideway for moving it into predetermined alignment with said carriage;

and means connected to urge said clamps from extended to retracted positions.

6. In a machine tool;

a power driven rotatable tool spindle;

positive drive means provided in the tool receiving end of said tool spindle;

a releasable clamp mechanism provided in the tool receiving end of said spindle in proximity to said positive drive means;

means for activating said clamp mechanism into clamping engagement with a tool having a shank inserted in the tool receiving end of said spindle and being provided with complementary drive means engageable with the positive drive means in said spindle;

means for rotating said tool spindle to a predetermined angular position to retain the positive drive means carried thereby in a position to facilitate a tool change;

a tool storage matrix including moving means operable to move a preselected tool including positive driving means carried thereby into a predetermined angularly spaced position relative to said tool spindle;

a tool change mechanism including positive gripping means actuatable into clamped engagement with the tool in said spindle and the preselected tool;

means for releasing said clamp activating means;

means for moving said tool change mechanism for interchanging the preselected tool with the tool in said spindle in a manner that the positive drive means carried by said preselected tool engage the complementary positive drive means in said spindle;

means for releasing said tool gripping means and for reactivating said clamp mechanism to positively clamp the preselected tool in said spindle;

and a power drive mechanism connected to drive said tool spindle independently of said angular positioning means for performing a machining operation.

7. In a machine tool;

a rotatably power driven tool receiving spindle in said machine;

a disengageable tool clamp associated with said spindle;

a tool storage matrix provided with a plurality of tool storage sockets;

a plurality of tools having shanks releasably fitted within said sockets;

a resiliently biased clamp associated with each of said sockets and urged into clamping engagement with the tool shank positioned therein, said clamps being adapted to engage said tool shanks with sufficient force to prevent withdrawal of said tools from said sockets;

indexably operative power driven means connected to move said matrix for advancing a preselected one of said tools to a tool change ready station;

a power driven positioning mechanism responsive to arrival of said matrix at selected position and being operative to latch said matrix in position and to release the clamp associated with the storage socket in the ready station to permit withdrawal of the preselected tool;

a tool change mechanism carried for axial movement at said ready station between said preselected tool and said tool spindle, said mechanism being carried for rectilinear movement along a path parallel to the axis of said tool spindle;

a pair of tool grip devices operatively carried by said mechanism for laterally extensible movement from a retracted position into clamping engagement with the preselected tool and a tool in said spindle;

means for disengaging said tool clamp prior to a tool change;

first power operable means connected to move said mechanism axially for withdrawing said tools from said storage socket and said spindle;

second power operable means connected to actuate said mechanism for interchanging the position of said tools for moving said preselected tool into alignment with said tool spindle;

a reverse mechanism operative to actuate said first power operable means for inserting said interchanged tools into said storage socket and said spindle respectively;

and means for reengaging said spindle clamp to secure said preselected tool in said spindle.

8. In a machine tool;

a reciprocable support carriage;

a reversible power drive transmission operatively connected to move said support carriage in selected direction;

a tool change member pivotally secured to said carriage for reciprocable movement therewith;

a pair of laterally extensible gripping devices carried by said tool change member;

a second reversible power drive transmission connected to effect selective extensible movement of said devices into gripping engagement with a pair of elements relatively movable into proximity therewith;

a third power drive connected to pivot said member whenever said carriage is at the limit of its movement in one direction for interchanging the positions of said devices;

and guide means connected to guidably constrain said carriage for its full extent of reciprocable movement, said guide means being simultaneously operative to restrain said tool change member against pivotal movement excepting during the interval that said carriage is at its limit of movement in one direction.

9. In a tool change mechanism for a machine tool;

a horizontal guideway;

a carriage slidably carried by said guideway for rectilinear movement;

a tool changer pivotally secured to said carriage for rectilinear movement therewith, said changer being provided with an upper abutment disposed to slidably engage said guideway to preclude pivotal movement thereof whenever said changer is being operated to withdraw or insert tools;

a pair of tool carrying sockets carried for relative bodily movement into positions of proximity to said tool changer;

a bodily movable power driven tool spindle carrying one of said sockets;

a tool storage member carrying the other of said sockets and being provided with a plurality of additional tool storage sockets;

a pair of power operated tool clamps extensibly movable from retracted positions into clamped engagement with tools carried by said sockets;

first power drive means for moving said carriage rectilinearly along said guideway for extracting said tools from said sockets until the upper changer abutment is disengaged from said guideway;

second power drive means connectable to rotate said changer mechanism 180° for interchanging the relative positions of said tools;

a lower changer abutment being moved into approximate alignment with said guideway upon pivotal movement of said changer;

a reverser connected to effect reversed movement of said first power drive means for moving said carriage and said tool changer in an opposite direction to urge the lower abutment presented by said changer into guiding engagement with said guideway to align the interchanged tools with said tool receiving sockets, said reversedly operating power drive means effecting continued movement of said carriage and changer until said interchanged tools are positioned in said sockets;

and means connected to disengage and retract said tool clamps.

10. In a machine tool;

a pair of tool carrying support members bodily movable into predetermined spaced apart positions, one of said members being adapted to store a preselected tool and the other of said members being bodily movable for performing a machining operation;

releasable tool securing means respectively carried by said members;

means for releasing said tool securing means prior to effecting an interchange of tools therebetween;

a guideway positioned between said support members;

a carriage carried by said guideway for reciprocable rectilinear movement;

a tool changer pivotally secured to said carriage and disposed to slideably engage said guideway whenever tools are withdrawn from or inserted into said support members;

a pair of selectively operative tool clamps carried by said changer for laterally extensible movement into clamped engagement with tools carried by said members;

power drive means connected to move said carriage and said changer along said guideway;

means for pivoting said changer relative to said carriage for interchanging the relative positions of said tools;

means for reversing said power drive means to move said carriage and said changer in a direction to insert the interchanged tools into said tool support members;

and means for disengaging and retracting said tool engaging clamps.

11. In a machine tool;

a guideway;

a member slidably secured to said guideway for reciprocable movement therealong;

a second member pivotally secured to said first member for reciprocable movement therewith, said second member being disposed to slidably engage said guideway for retaining it in predetermined alignment with said first member;

a pair of tool grips carried within said second member for laterally extensible movement therefrom in a plane perpendicular to the plane of movement of said members;

reversible means connected to move said devices into gripping engagement with a pair of elements positionable in predetermined proximity to said second member;

first power drive means connected to move said members in one direction until said second member is moved out of engagement with said guideway;

second power operable means connected to pivot said second member until another portion thereof is engageable with said guideway upon movement in the opposite direction;

and means for reversing the operation of said first power operable means for returning said members to their starting positions with respect to said guideway.

12. In a machine tool;

a power driven tool spindle provided with a tool receiving end presenting positive drive means;

a selectively releasable clamp carried by the tool receiving end of said spindle in proximity to said positive drive means and being operative to securely clamp a tool in meshing engagement with said positive drive means carried thereby;

a power driven tool change mechanism associated in operative proximity to said tool spindle;

a tool carried by said change mechanism presenting positive drive means adapted to be moved into meshing engagement with the drive means carried by said tool spindle, said tool being so carried by said change mechanism that the positive drive means presented thereby is in predetermined angular position;

power driven means operative to effect bodily movement of said spindle relative to said change mechanism for receiving a tool carried thereby;

another spindle drive connected to rotate said tool spindle for moving the positive drive means associated therewith into a predetermined angular position;

means for actuating said tool clamp to a released position for receiving a tool;

control means operative to activate said tool change mechanism for inserting the tool carried thereby into the tool receiving end of said spindle with the positive drive means respectively carried by said tool and said spindle moved into intermeshing engagement;

and means for reactivating said spindle tool clamp for securing the tool whereby said tool spindle is bodily movable to perform a machining operation.

13. In a machine tool;

a guide member;

a carriage slidably secured to said guide member for rectilinear movement;

power drive means connected to operate said tool change mechanism for moving the tool carried thereby into engagement with said spindle in a manner that the keyway in the tool intermeshingly engages the key presented by the spindle; and, means for actuating said tool securing means for retaining the tool in intermeshing positive driving engagement with said spindle.

31. In a machine tool;

a rotatable tool receiving spindle presenting positive tool engaging drive means;

relatively movable tool storage means including a tool carried thereby presenting complementary positive drive means releasably engageable with the positive drive means presented by said spindle;

positioning drive means connected to effect relative positioning movement between said storage means and said spindle for moving a tool carried by said storage means into a predetermined position relative to said tool receiving spindle;

tool engaging gripping means carried for movement relative to said spindle and said storage means and being movable into gripping engagement with a predeterminately positioned tool carried by said storage means; and, power drive means connected to operate said tool engaging gripping means for bodily moving a predeterminately positioned tool carried by said storage means into receiving engagement with said spindle and in the manner that the positive drive means presented by said spindle intermeshingly engage the complementary positive drive means presented by the tool.

32. In a machine tool;

a rotatable tool receiving spindle presenting positive tool engaging drive means;

relatively movable tool storage means including a tool carried thereby presenting complementary positive drive means releasably engageable with the positive drive means presented by said spindle;

power drive means connected to effect relative movement between said storage means and said spindle for moving a tool carried by said storage means into a predetermined position relative to said tool receiving spindle;

spindle drive means connected to rotate said spindle to a predetermined angular position to facilitate proper intermeshing engagement of the positive drive means presented thereby with the complementary positive drive means presented by the predeterminately positioned tool carried by said storage means;

tool engaging gripping means carried for movement relative to said spindle and said storage means and being movable into gripping engagement with a predeterminately positioned tool carried by said storage means; and, power drive means connected to operate said tool engaging gripping means for bodily moving a predeterminately positioned tool carried by said storage means into receiving engagement with said spindle and in a manner that the positive drive means presented thereby intermeshingly engage the complementary positive drive means presented by the tool.

33. A machine tool comprising a tool spindle;

magazine means for supporting discrete tool devices of a plurality of tool devices in a predetermined angular position;

means for sequentially transferring selected devices of said plurality of tool devices in said magazine means to said tool spindle;

means for rotating said tool spindle and a selected tool device transferred thereto;

means for stopping said tool spindle in the same predetermined angular position upon discontinuation of its rotation;

and means for returning the tool devices in said tool spindle to said magazine means in said predetermined angular position in which said tool device was previously supported therein.

34. A tool changing apparatus for a machine having a work mounting element and a tool spindle adapted to mount a cutting tool, said tool changing apparatus comprising;

a tool storage matrix mounted adjacent said machine and adapted to selectively releasably support a plurality of cutting tools, said tools being adapted to be mounted interchangeably in said tool spindle;

a tool change arm mounted between said tool spindle and a tool storage matrix, said tool change arm being movable relative to said spindle and said tool storage matrix to engage and withdraw selected cutting tools from said tool storage matrix and transfer the selected tool to a position adjacent the spindle and to mount the tool in said spindle;

relatively movable portions of said tool change arm including a carrier support; a jaw carrier having retracted and extended positions with respect to said carrier support; and a tool clamping jaw movably mounted on said jaw carrier for moving from an open position to a closed position for engaging a tool to said jaw carrier when said jaw carrier is in the extended position; and, means for actuating said jaw carrier and clamping jaw to engage the selected tool and secure it to said tool change arm so that the tool may be transferred.

35. In a machine tool;

tool storage means and a relatively movable tool receiving spindle;

a tool transfer mechanism operatively movable for selectively interchanging tools between said spindle and said storage member;

a tool securing grip carried by said mechanism; and, a power drive connected to move said transfer mechanism and including means for actuating said grip into releasable clamped engagement with a tool as a prerequisite to initiating a tool interchange.

36. In a machine tool having a tool storage member and a rotatable tool spindle provided with tool receiving sockets;

a movable tool change mechanism including a selectively actuatable tool grip carried for bodily extensible movement and to effect gripping engagement with a tool; and, power means connected to actuate said tool change mechanism for effecting extensible movement and gripping engagement of said grip with a tool and a pair of tool receiving supports respectively presenting positive tool interengaging drive means and being carried for relative bodily movement, said supports comprising a rotatable tool spindle and a tool storage member;

first power drive means connected to effect relative bodily movement of said supports to predetermined spaced apart positions with the interengaging drive means properly aligned to effect a tool interchange therebetween;

a pair of tools respectively presenting interengaging drive means releasably engaged with the tool interengaging drive means presented by said supports;

a tool change mechanism including tool grips operative to effect an interchange of tools between said supports;

and power drive means for actuating said mechanism and said grips.

24. In a machine tool;

a pair of tool receiving supports comprising a tool spindle and a tool storage member carried for relative bodily movement, said tool supports respectively presenting disengageable positive drive means;

a pair of tools presenting like positive drive means and being releasably carried by said supports with the positive drive means presented by said tools in positive intermeshing engagement with the positive drive means respectively presented by said supports;

power drive means connected to effect relative bodily movement of said supports for moving the tools carried thereby to positions for interchanging tools therebetween and with the positive drive means presented by said supports in predetermined angular relationship;

and a power actuatable tool change mechanism operatively interconnected to bodily interchange said tools between said supports.

25. In a machine tool;

a tool change mechanism comprising a housing carried for bodily tool changing movement;

a pair of retracted tool change grips operatively carried within said housing for selectively extensible gripping movement;

a pair of tool receiving supports;

power drive means connected to move said supports into predetermined spaced positions relative to said housing for facilitating a tool change between said supports;

second power drive means operatively connected to extend said grips into clamping engagement with tools carried by said predeterminately positioned supports;

and third power operable means connected to move said housing for interchanging tools between said predeterminately positioned supports.

26. In a machine tool;

tool storage means and a relatively movable tool receiving spindle;

first power driven means connected to effect relative positioning movement of said storage means and said spindle for effecting an interchange of tools therebetween;

a bodily movable tool transfer mechanism operatively movable for selectively interchanging tools between said spindle and said storage member;

a power actuated tool securing grip carried by said mechanism;

and a second power drive connected to move said transfer mechanism and including means for actuating said grip into releasable clamped engagement with a tool as a prerequisite to initiating a tool interchange.

27. In combination with a machine tool having;

a rotatable tool support member for performing machining operations;

a relatively movable tool storage member;

means connected to move said members for positioning tools respectively carried thereby to a tool change ready station;

and a power driven bodily movable tool change member including an extensible tool grip coordinately operative therewith for bodily transferring a tool between said members at said ready station.

28. In a machine tool having a rotatable tool spindle and a tool storage member respectively provided with tool receiving sockets;

a movable tool change mechanism including a selectively actuatable tool grip carried for bodily extensible movement into gripping engagement with a tool; and, power operable control means connected to actuate said tool change mechanism for effecting extensible movement of said grip into gripping engagement with a tool to bodily transfer a tool between the tool receiving sockets presented by said spindle and said storage member.

29. In a machine tool;

a rotatable tool spindle provided with a tool receiving socket and a plurality of spaced apart abutment faces comprising positive tool engaging drive means;

tool storage means;

a tool releasably carried by said storage means presenting positive drive means comprising a plurality of abutment faces complementary to said abutment faces presented by said spindle; and, a relatively movable power driven tool change mechanism operative to remove a tool from said storage means and bodily insert it into the spindle socket with the positive drive abutment faces respectively presented by said spindle and the inserted tool moved into intermeshing driving engagement.

30. In a machine tool;

a power driven rotatable tool receiving spindle presenting a tool engaging key;

selectively operable power actuated tool securing means adapted to retain a tool having a complementary keyway in positive driving engagement with the key presented by said spindle;

power driven positioning means adapted to effect angular positioning movement of said spindle for facilitating intermshing engagement of the spindle key with a keyway carried by a tool adapted to be automatically inserted therein;

a relatively movable power driven tool change mechanism for transferring a tool provided with a keyway complementary to the spindle key;

a tool change member pivotally secured to said carriage and provided with a portion slidably engaging said guide member during a part of carriage movement in either direction;

a power driven tool grip laterally extensible from said member into releasable clamping engagement with a tool carried in proximity thereto;

a reversible power drive energizeable to move said carriage in one direction until said member is moved out of engagement with said guide member;

a second power drive responsive to arrival of said carriage at its limit of movement in one direction connected to pivot said member until another portion thereof is brought into guiding alignment with said guide member;

and means connected to activate said reversible drive mechanism for moving said carriage in the opposite direction for moving the other portion thereof into slidable guiding engagement with said guide member whereby said tool grip is moved to a different predetermined position relative to said carriage for selectively moving a tool from one position to another.

14. In a tool change mechanism for a machine tool;
a horizontal guideway;
a carriage slidably secured to said guideway for rectilinear movement;
a tool change member integrally formed with a tubular extension journalled to rotate in said carriage, said member presenting a portion slidably engaging said guideway for maintaining it in predetermined alignment with said carriage during part of the rectilinear movement in either direction;
a pair of tool grips normally retracted within said member, said tool grips being laterally extensible from retracted position to extended clamped position in planes perpendicular to the plane in which the carriage and member are movable;
a selectively operable power drive shaft extending through said tubular shaft connected to effect laterally extensible clamping movement of said tool grips, said shaft being reversibly operable to effect movement of said tool grips from extended position to retracted position within said member;
first power operable means responsive to movement of said tool grips to extended clamped position for effecting rectilinear movement of said carriage in one direction until said member is moved out of engagement with said guideway;
second power operable means responsive to arrival of said carriage at its limit of movement connected to rotate said member until another portion thereof is aligned with said guideway;
and means responsive to the changed position of said member connected to reverse the operation of said first power operable means for moving said carriage in the opposite direction and for moving the other portion of said member into aligning engagement with said guideway for maintaining said tool grips in predetermined interchanged position.

15. In a machine tool;
a horizontal guideway;
a carriage slidably secured to said guideway for rectilinear movement in one direction;
a tubular shaft journalled in said carriage for rotation about an axis parallel to said guideway;
a member secured to said shaft and being provided with spaced apart portions respectively disposed to slidably engage said guideway during a part of the movement of said carriage in either direction;
a pair of selectively operable tool grips extensible in opposite directions from said carriage;
power drive means connected to move said carriage together with said member in one direction until said member is moved to a position out of engagement with said guideway;
a second power drive connected to effect pivotal movement of said member until another portion thereof is aligned with said guideway;
and means for reversing the operation of said power drive means for moving said carriage in the opposite direction for returning the other portion of said member into guiding engagement with said guideway.

16. In a machine tool;
a tool storage magazine provided with a plurality of tool receiving storage sockets, each of said storage sockets being provided with a keyway disposed in like angular relationship relative to said magazine;
a plurality of power actuated tool clamps respectively associated with said storage sockets;
a plurality of tools respectively retained in said storage sockets by operation of said clamps during movement of said magazine;
power driven means connected to move said magazine for positioning a preselected tool carried thereby in a tool change ready station;
power actuated means responsive to arrival of said magazine at selected position connected to latch said magazine against movement, said power actuated latching means being simultaneously operative to disengage the clamp mechanism associated with the storage socket carrying the selected tool in said ready station;
an associated power driven tool receiving spindle carried for bodily movement to a tool change ready station, said tool spindle being provided at its tool receiving end with a keyway identical in configuration to the keyways in said storage sockets;
a power drive motor connected to rotate said tool spindle for performing a machining operation;
a positioning control connectable to operate said spindle motor for rotating said spindle for moving the keyway contained therein to a predetermined angular position as a prerequisite to effecting a tool change function;
and a tool change mechanism including tool securing means operatively actuatable to interchange a tool carried by said spindle with a preselected tool in the tool storage socket carried by said magazine to said tool change ready station.

17. In a machine tool;
a pair of tool receiving sockets carried for relative bodily movement and respectively provided with positive drive means to preclude the angular displacement of tools releasably inserted therein;
a pair of tools releasably carried by said sockets and presenting positive driven means respectively disposed to be engaged by said positive drive means presented by said sockets, one of said sockets being rotatable to perform a machining operation;

power driven means connected to effect relative bodily movement of said sockets for positioning the positive drive means respectively carried thereby in predetermined spaced apart alignment for facilitating a tool interchange therebetween;

a tool change mechanism including a pair of releasable tool grips operatively actuatable to grip said tools respectively carried by said tool sockets and being movable for effecting an interchange of tools therebetween;

and second power drive means connected to actuate said tool change mechanism and said grips for interchanging tools between said prepositioned sockets.

18. In a machine tool;

a tool change mechanism carried for axial and rotatable movement;

a pair of power actuatable tool grips carried by said mechanism for selective extensible movement from retracted positions to extensible tool gripping positions;

a pair of tool receiving supports respectively comprising a rotatable tool spindle and a tool storage member carried for relative bodily movement;

first power drive means connected to effect bodily movement of said supports for moving tools respectively carried thereby to tool changing positions adjacent said mechanism for interchanging tools between said supports;

second power drive means connected to effect extensible movement of said grips into tight clamping engagement with tools predeterminately positioned by said supports;

third power drive means connected to effect axial and rotatable movement of said tool change mechanism for effecting an interchange of tools between said predeterminately positioned supports;

and control means connected to effect coordinated operation of said power drive means.

19. In a tool changing machine;

a tool receiving storage socket presenting a positive drive slot;

a rotatable tool spindle having a tool receiving socket presenting a positive drive slot similar to that in said storage socket;

a pair of tools presenting keys and being respectively positively engaged in said storage socket and said spindle socket;

separate power drive means respectively connected to rotate said spindle and to effect relative bodily movement between said storage socket and said spindle;

control means operative to actuate said power drive means for moving said storage socket and said spindle socket into predetermined spaced positions with the positive drive slots respectively presented thereby in proper tool changing alignment;

and a tool changing mechanism operatively connected to effect an interchange of tools between said storage socket and said spindle socket.

20. In a tool changing machine operative to interchange a pair of tools respectively presenting like positive drive means;

a movable tool storage member provided with a socket presenting positive drive means operative to releasably interengage the complementary positive drive means presented by a stored tool;

a bodily movable rotatable tool spindle having a tool socket presenting positive drive means adapted to interengage the positive drive means presented by a tool releasably inserted therein;

separate power drive means respectively connected to rotate said spindle and to effect bodily movement of said spindle for performing a machining operation;

positioning control means operative to actuate said power drive means for moving said spindle into a predetermined spaced position relative to said spindle and with the positive tool driving means presented thereby in proper angular relationship with the drive means presented by said storage socket for effecting a tool interchange;

a tool change mechanism including tool engaging grips operable to grip tools respectively carried within said predeterminately positioned sockets and being movable to effect an interchange of tools therebetween;

and third power drive means connected to actuate said tool change mechanism.

21. In a tool change mechanism for a machine tool;

a storage member and a tool spindle carried for relative bodily movement;

a pair of tool receiving sockets presented by said member and said spindle respectively for movement therewith to predetermined spaced positions to facilitate a tool change therebetween;

a tool changer and a pair of power actuated tool grips carried thereby, said changer and said grips being coordinately operative to effect an interchange of tools between said predeterminately positioned sockets;

separate power operable means respectively connected to actuate said changer and said grips;

and control means connected to actuate said power operable means for interchanging tools between said predeterminately positioned sockets.

22. In a machine tool;

a pair of tool receiving supports carried for relative bodily movement, said tool supports comprising a rotatable tool spindle and a tool storage member;

a tool change mechanism and a pair of power actuated tool grips carried thereby and being operative to effect an interchange of tools between said supports;

first power drive means connected to effect relative bodily movement of said supports to predetermined positions for interchanging tools therebetween;

and second power drive means connected to effect coordinated power actuation of said mechanism and said grips for effecting an interchange of tools between said predeterminately positioned tool supports.

23. In a tool change mechanism;

bodily transfer of the gripped tool between the tool receiving sockets presented by said spindle and said storage member.

37. A machine tool comprising;

a tool spindle;

means for stopping said tool spindle in the same predetermined angular position upon every discontinuation of its rotation;

magazine means for supporting discrete tool devices of a plurality of tool devices in a predetermined angular position; and means for transferring selected devices of said plurality of tool devices in said magazine means to said tool spindle and returning the tool devices in said tool spindle to said magazine means in the same predetermined angular position in which said tool device was previously supported therein.

* * * * *